United States Patent
Deroo et al.

(10) Patent No.: US 11,982,989 B2
(45) Date of Patent: May 14, 2024

(54) SYSTEM AND METHOD FOR PREFLIGHTING A COMPUTER AIDED DESIGN FILE CORRESPONDING TO A TOOL FOR PROCESSING SHEET MEDIA

(71) Applicant: ESKO Software BVBA, Ghent (BE)

(72) Inventors: Richard C. Deroo, Reading, MA (US);
Didier M. Blanvilain, Vannes (FR);
Jason Pride, Chicopee, MA (US);
Inessa Vengerik, Worcester, MA (US);
Heidi Roskuski, Chicopee, MA (US);
James Feole, Northampton, MA (US);
Llewelyn Evans, Wilbraham, MA (US)

(73) Assignee: ESKO SOFTWARE BV, Ghent (BE)

( * ) Notice: Subject to any disclaimer, the term of this patent is extended or adjusted under 35 U.S.C. 154(b) by 290 days.

(21) Appl. No.: 16/668,167

(22) Filed: Oct. 30, 2019

(65) Prior Publication Data
US 2020/0133232 A1      Apr. 30, 2020

Related U.S. Application Data

(60) Provisional application No. 62/886,436, filed on Aug. 14, 2019, provisional application No. 62/877,178, (Continued)

(51) Int. Cl.
*G05B 19/4097*   (2006.01)
*G05B 19/4093*   (2006.01)
(Continued)

(52) U.S. Cl.
CPC ... *G05B 19/4097* (2013.01); *G05B 19/40931* (2013.01); *G05B 19/40938* (2013.01); *G06F 30/17* (2020.01); *G06F 30/20* (2020.01)

(58) Field of Classification Search
CPC .......... G05B 19/4097; G05B 19/40931; G05B 19/40938; G06F 30/17; G06F 30/20;
(Continued)

(56) References Cited

U.S. PATENT DOCUMENTS 7,222,295 B1 * 5/2007 Davis .................. G06F 3/04815
                                                700/97
7,278,127 B2 * 10/2007 Darden ................ G06F 30/398
                                                716/112

(Continued)

FOREIGN PATENT DOCUMENTS

| JP | 05245745 | * | 9/1993 | ............ B23Q 41/08 |
| KR | 101769433 B1 | | 8/2017 | |
| WO | WO2012053103 | * | 10/2010 | ......... G06F 30/3323 |

OTHER PUBLICATIONS

MIMAKI Engineering, "ArtiosCad Designer Designer Solution Quick reference guide", 2016, p. 132, downlaoded from file:///C:/Users/olopez/Documents/e-Red%20Folder/16668167/ArtiosCAD_Quick_D202935_V1.2.pdf (Year: 2016).*

(Continued)

*Primary Examiner* — Darrin D Dunn
*Assistant Examiner* — Olvin Lopez Alvarez
(74) *Attorney, Agent, or Firm* — Buchanan Ingersoll & Rooney PC

(57) ABSTRACT

A method for performing a design rule check of a computer aided design (CAD) file corresponding to a geometry of a tool for use in a process for making an article from a starting material. Design rules defined to avoid a geometry of the tool documented as causing an inefficiency in a non-printing or non-platemaking operation of the process are stored in a computer. A design rule checking (DRC) module of the computer processes the CAD file relative to the stored design rules, identifies violations, automatically suggests design changes responsive to each violation, receives a user (Continued)

input responsive to suggested design changes, and modifies the CAD file in response to the user input. Non-transitory computer readable media containing code for implementing the method and related CAD systems are also described.

25 Claims, 43 Drawing Sheets

Related U.S. Application Data filed on Jul. 22, 2019, provisional application No. 62/753,209, filed on Oct. 31, 2018.

(51) Int. Cl.
*G06F 30/17* (2020.01)
*G06F 30/20* (2020.01)

(58) Field of Classification Search
CPC .............. G06F 2111/04; G06F 2113/20; G06F 2113/24; G06F 2119/18; G06F 2119/22; B21D 37/205; B23P 15/406; B26F 2001/4463; Y02P 90/02
See application file for complete search history.

(56) References Cited

U.S. PATENT DOCUMENTS

| | | | | |
|---|---|---|---|---|
| 8,103,984 B1* | 1/2012 | Pierrat | ...................... | G03F 1/78 716/53 |
| 8,423,325 B2* | 4/2013 | Sims, Jr. | ................. | G06F 30/00 703/1 |
| 9,916,399 B2* | 3/2018 | Furst | ...................... | G06F 30/00 |
| 10,002,207 B2* | 6/2018 | Pettersson | ............. | B65B 59/001 |
| 10,192,018 B1* | 1/2019 | Gerousis | ............... | G06F 30/392 |
| 11,132,473 B2* | 9/2021 | Phinney | .................. | G06F 30/10 |
| 2003/0189566 A1* | 10/2003 | Fuki | ........................ | G06F 30/17 345/419 |
| 2005/0168459 A1* | 8/2005 | Baird | .................... | B65D 5/4216 715/964 |
| 2005/0223348 A1* | 10/2005 | Frank | .................... | G06F 30/398 716/112 |
| 2006/0264125 A1* | 11/2006 | Liu | .................... | G05B 19/4097 439/894 |
| 2007/0221518 A1* | 9/2007 | Chatelain | ........... | B65D 85/1045 206/268 |
| 2008/0183524 A1* | 7/2008 | Suresh | ............... | G06Q 10/0639 705/7.38 |
| 2008/0229262 A1* | 9/2008 | Harashima | ............ | G06F 30/398 716/106 |
| 2009/0024490 A1* | 1/2009 | Satterfield | .......... | G06Q 30/0603 705/26.5 |
| 2011/0218777 A1* | 9/2011 | Chen | ....................... | G06F 30/00 703/1 |
| 2013/0074024 A1* | 3/2013 | Chase | ................... | G06F 30/398 716/112 |
| 2014/0088931 A1 | 3/2014 | Sasaki et al. | | |
| 2015/0331965 A1* | 11/2015 | Eschbach | ................ | G06F 30/00 493/56 |
| 2015/0366293 A1* | 12/2015 | Clarkson | .................. | A43B 1/04 703/1 |
| 2016/0098033 A1* | 4/2016 | Singh | ................. | G05B 19/4097 700/98 |
| 2017/0297084 A1* | 10/2017 | Janis | ....................... | B32B 27/08 |
| 2017/0343984 A1* | 11/2017 | Czinger | ............. | G05B 19/4099 |
| 2019/0294145 A1* | 9/2019 | Foppa Pederetti | ....... | B26F 1/44 |
| 2021/0138754 A1* | 5/2021 | Cuennet | ................. | B65H 29/16 |

OTHER PUBLICATIONS

The BOX maker, "Understanding the Steel DieCutting Process for Packaging" 2019, p. 13 downloaded from https://www.boxmaker.com/blog/steel-die-cut (Year: 2019).*
ESKO "Structural design, manufacturing and communication for packaging and displays", 2013, p. 8, downloaded from https://manualzz.com/download/22017414 (Year: 2013).*
International Search Report and Written Opinion for International Application No. PCT/EP2019/079797, dated Feb. 25, 2020, 21 pages.
Lui et al., "Optimal design of flat patterns for 3D folded structures by unfolding with topological validation" Computer-Aided Design 39 (2007), pp. 898-913.
International Preliminary Report on Patentability and Written Opinion for International Application No. PCT/EP2019/079797, dated Apr. 27, 2021, 14 pages.
Office Action (Communication pursuant to Article 94(3) EPC) issued Mar. 13, 2024, by the European Patent Office in corresponding European Patent Application No. 19 798 564.1-1224. (18 pages).
Chinese Office Action for Chinese Application No. 201980044336.9, issued Mar. 16, 2024 with English translation, 26 pages.

* cited by examiner

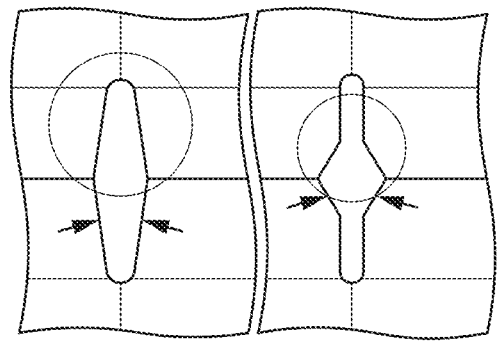
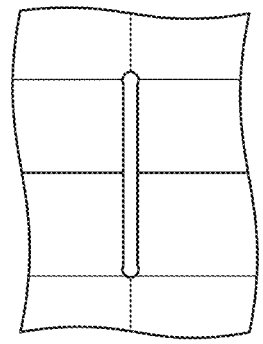
FIG. 14A  FIG. 14B
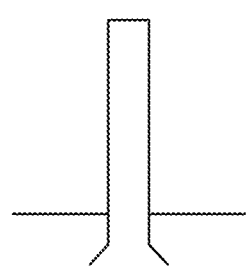
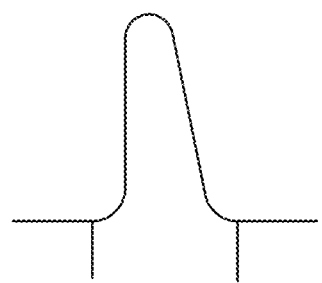
FIG. 15A  FIG. 15B
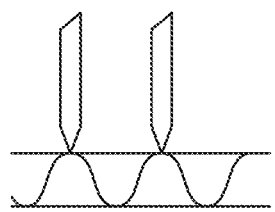
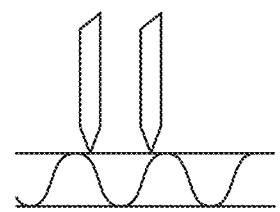
FIG. 16A  FIG. 16B

SYSTEM AND METHOD FOR PREFLIGHTING A COMPUTER AIDED DESIGN FILE CORRESPONDING TO A TOOL FOR PROCESSING SHEET MEDIA

CROSS REFERENCE TO RELATED APPLICATIONS

This application claims priority to U.S. Provisional Application Ser. No. 62/753,209, filed Oct. 31, 2018, and to U.S. Provisional Application Ser. No. 62/877,178, filed Jul. 22, 2019, and to U.S. Provisional Application Ser. No. 62/886,436, filed Aug. 14, 2019, all of which are titled SYSTEM AND METHOD FOR PREFLIGHTING A COMPUTER AIDED DESIGN FILE CORRESPONDING TO A TOOL FOR PROCESSING SHEET MEDIA, all of which are incorporated herein by reference.

BACKGROUND OF THE INVENTION

Die cutting, such as with a die board or Steel Rule Die (SRD), is well known in the art for cutting shapes from sheets of corrugated or flat plastic or paperboard, as well as from other materials, such as gasket materials, chipboard, fabrics and felts, foam (open cell or closed cell), natural and synthetic rubbers, thin metals (i.e. 0.005 or less), wood (e.g. cork), acrylic, composites, fiberglass, magnets, sponges, or any other flat material suitable for cutting, found in the industry.

The manufacture of packaging, particularly consumer goods packaging made from sheet media such as cardboard, plastic, and the like, often involves die cutting processes. As shown in FIG. 1, a SRD comprises sharpened steel blades or rules 10 bent and formed into a pattern 20. In some locations between adjacent blades that define a waste section, the SRD may comprise a foam or other springy material 40 that is compressed as the steel rules of the die penetrate the sheet media, but that has a sufficient recoil force to at least partially eject the waste material disposed between the adjacent rules as the die is retracted. The blades are typically held in position by mounting them on a base material 30, such as plywood, acrylic or the like. As is known in the art, the die in use may be compressed against a backing plate that has grooves corresponding to each blade configured to penetrate the sheet material. The die and backing plate are then placed in a press with the sheet material to be cut disposed between them, the die and backing plate are brought together with sufficient compression force to stamp out the cut shape, and then retracted to release the cut sheet. The sheet and/or cut shapes may then be further processed by stripping away waste, folding, and gluing.

Nomenclature relating to SRD tools is understood to those of skill in the art, but is discussed here for clarity, with reference to FIGS. 21A and 21B, which while also depicting an anomaly that is explained in further detail below, also show some basic structures referred to in this section as background. For SRD processes using a flatbed press, rules 2150 are typically mounted in a dieboard 2100 (e.g. made of wood), which is cut (e.g. with a laser) to have slots 2102 for receiving the rules. Various elements may be present in the interface between the rule and dieboard for stability. For example, periodically, the slots have a discontinuity 2014, referred to as a "bridge," and the corresponding rule has a notch 2154 for receiving the bridge. Cutouts on the bottom of the rule are generally referred to as "bridges" as well, whereas cutouts on the top of the rule are generally referred to as "nicks," such as nick 2152 illustrated in FIG. 21B. In the cut media, a nick results in a discontinuity in a cut line, and retaining a shape in position in the sheet while the sheet proceeds through the press. The press may blank (i.e. separate the shapes as the last unit in the press) or the shapes may later be manually separated. A "special rule" is a rule that is slotted into the dieboard but has a special pattern on top, such as a wave, scallop, or perforation. As depicted in FIG. 21C, the term "land" refers to the area 2170 at the end of a special rule on dieboard 2200 that acts as a buffer for a special rule pattern 2172. A crease 2182, as depicted on a processed sheet 2300 of FIG. 21D, is used on a feature (e.g. a tab 2184) that has a cut along only a portion thereof (e.g. along line 2180) so that the feature can be folded along the crease 2182.

The term "caliper" refers to the thickness of a sheet of material to be cut. The term "conversion" is typically understood to be the process for converting a "board" (or panel or sheet of starting material, such as corrugated cardboard) into a packaging unit, and may include printing, cutting, folding, and/or a gluing operation steps. In addition to the use of SRD in a flatbed press, SRD structures may also be used in a rotary cutter design. Packaging may also be created using what is known as a Flexo Folder Gluer (FFG). This type of packaging does not use SRD. Instead a long web roll of paper is run through a corrugator and combined to form a corrugated web. The corrugated web is scored in the machine direction using scoring wheels and slits to reduce the web into sheets of desired sizes for later processing. The sheets are fed into the FFG, where printing, slots and transverse scores are applied and folded.

Designers of packaging or point of sale displays to be created from shapes die cut from sheet media often produce designs and layouts without full knowledge of best manufacturing practices. This may lead to design cycles that are longer and more iterative than necessary, inefficient usage of the die press when cutting the media, and inconsistent quality across the design staff of a particular design firm. The performance and efficiency of the die press is largely based on the quality of the design and the cutting die. The quality of the cutting die is impacted by the structural design of the shape to be cut. Therefore, there is a need in the industry to help designers identify potential production issues in their structural designs before the design is released for estimating or production.

Designers of packaging and displays typically use computer-aided design (CAD) software for creating the designs to be manufactured, and those same CAD design files are used by a die making system in the manufacture of the dies. ArtiosCAD™ software, manufactured by Esko Software BVBA, the assignee of the present invention, is a popular such CAD program targeted to the packaging industry. Although the ArtiosCAD software has features that permit conducting routine "preflight" checking, also called design rules checking (DRC), and preflight checking has been in prevalent use in the printing and platemaking industries for many years, the rules pertaining to such routine design checks of the CAD file in ArtiosCAD tend to be aimed at detection of geometric anomalies in the design file, particularly design files imported from other sources, including anomalies such as overruns (where one line extends slightly beyond the point at which it intersects another line), underruns (where an endpoint of a line falls slightly short of the intersection of the line with another line), double lines, short lines and near intersections. The foregoing terms are well understood by those of skill in the art. Additional known rules performed as part of routine DRC operations are detailed in F05-14-04 Designer's Fixit (previously known as Diemaker's Fixit), Rev. 0.01, dated Oct. 26, 1999, updated Jan. 20, 2008, incorporated herein by reference.

Routine DRC rules as described in the foregoing reference are "geometric anomalies" that may indicate an unintended element of the design that a designer may want to fix to ensure the design as actually embodied in the CAD file is exactly what the designer intended. As noted above, however, certain attributes of a die design may introduce inefficiencies in the die or dieboard manufacturing process or finishing processes downstream of the cutting operation that do not render the dies inoperable or entirely corrupt the process for manufacturing the die, but may significantly decrease the throughput of the process in which the die is used or increase the manufacturing time or degrade the reliability of the die or dieboard relative to more efficient designs. Thus, such designs may be exactly what the designer intended, but the designer may be unaware of inefficiencies of the intended design on the cutting step, on finishing operations downstream of the cutting step or in the manufacture of the die or dieboard. Thus, there is a need in the art to help designers identify and remedy such inefficiencies.

SUMMARY OF THE INVENTION

One aspect of the invention is a method for performing a design rule check of a computer aided design (CAD) file, the CAD file corresponding to a geometry of a tool, such as but not limited to steel rule die, for use in a process for making an article from a starting material. The method comprises storing in a computer memory one or more design rules in computer code readable by a design rule checking (DRC) module of a computer processor, the one or more design rules comprising at least one process operation inefficiency design rule applicable to the CAD file. The at least one process operation inefficiency design rule is defined to avoid an inefficient but not inoperable geometry of the tool documented as causing an inefficiency in the process, such as but not limited to a geometry known to increase processing time in a process operation relative to a more efficient geometry when used in the process. The CAD file is processed relative to the one or more stored design rules file using the DRC module, and a violation of the at least one process inefficiency design rule is identified. The method comprises the DRC module automatically suggesting at least one design change responsive to the violation of the process inefficiency design rule, receiving a user input responsive to the suggested design change, and modifying the CAD file in response to the user input.

The CAD file may define a design comprising an individual periphery to be cut with the tool and/or a layout comprising a plurality of individual peripheries nested on a single sheet. In a packaging-manufacture process, the process operation inefficiency design rule corresponds to an inefficiency in a step for manufacturing a cutting tool or in a converting process that includes at least a cutting step using the cutting tool. The converting process step may comprise a finishing step downstream of the cutting step comprising a waste stripping or waste ejection step, a gluing step, or a scoring step. Cutting a sheet of the starting material using the tool may create a cut shape for further processing and at least one section of waste, in which case the process includes ejecting the at least one section of waste from the cut shape. The converting may also include scoring at least one portion of the cut shape to create a scored shape without fully perforating the cut shape, folding the cut shape and gluing at least one portion of the cut shape to another portion of the cut shape, or a combination of cutting and folding. The process may further comprise forming an article of packaging from the cut shape after scoring, folding, and/or gluing.

Another aspect of the invention comprises an article of manufacture comprising non-transitory computer readable media programmed with computer program code readable by a computer for instructing the computer to perform the method as described herein.

Still another aspect of the invention comprises a computer aided design (CAD) system for designing an article for manufacture from a starting material using a tool in a process. The system comprises a computer processor having a design rule checking (DRC) module; a user interface configured to enable a user to interactively provide a user input; and a computer memory. The computer memory is configured to store (a) one or more design rules in a format readable by the DRC module and (b) a CAD file that defines a geometry for the tool. The one or more design rules comprising at least one process inefficiency rule corresponding to an inefficient but not inoperable geometry of the tool. The DRC module is configured to evaluate the CAD file relative to the one or more design rules, identify in the CAD file one or more violations of the at least one process inefficiency design rule, automatically suggest at least one design change responsive to each identified violation of the at least one process inefficiency design rule, process a user input received in responsive to the suggested design change, and modify the CAD file in response to the user input.

BRIEF DESCRIPTION OF THE DRAWINGS

FIG. 14A illustrates exemplary efficient hole designs for an exemplary implementation of the invention.

FIG. 14B illustrates an exemplary inefficient hole design for the exemplary implementation of FIG. 14A.

FIG. 15A illustrates an exemplary inefficient notch design for an exemplary implementation of the invention.

FIG. 15B illustrates an exemplary efficient notch design for the exemplary implementation of FIG. 15B.

FIG. 16A illustrates a cross-sectional view of corrugated sheet material showing an exemplary efficient steel rule spacing for an exemplary implementation of the invention.

FIG. 16B illustrates a cross-sectional view of the corrugated sheet material of FIG. 15B showing an exemplary inefficient steel rule spacing.

DETAILED DESCRIPTION OF THE INVENTION

Referring now to the figures, various embodiments of the invention are directed to a design rules checker, and method of design rules checking, for computer aided design (CAD) files, including but not limited to two-dimensional (2D) files, corresponding to the geometry of a die, such as a steel rule die, for cutting a sheet of material, such as for creating a package. While not limited to any particular process or operations in such a process for making an article, the focus of the subject invention relates to non-printing and non-platemaking operations. It should be noted that the term "design rule" as used herein relates to the definition of the term "rule" as a regulation governing the design, and the term "steel rule" as used herein relates to the definition of "rule" as a strip of rigid material for making a straight line. Although the term "steel rule" is used for clarity and differentiation, it should be understood that use of this term is not intended to be limiting as to the materials of construction for the rules, which may be steel or any other material known in the art to be suitable for use as a "rule" for cutting, creasing, perforating, etc. At times, the term "rule" may be used alone, where the context should be clear to the reader as to which type of "rule" is being referenced.

Figure 10:
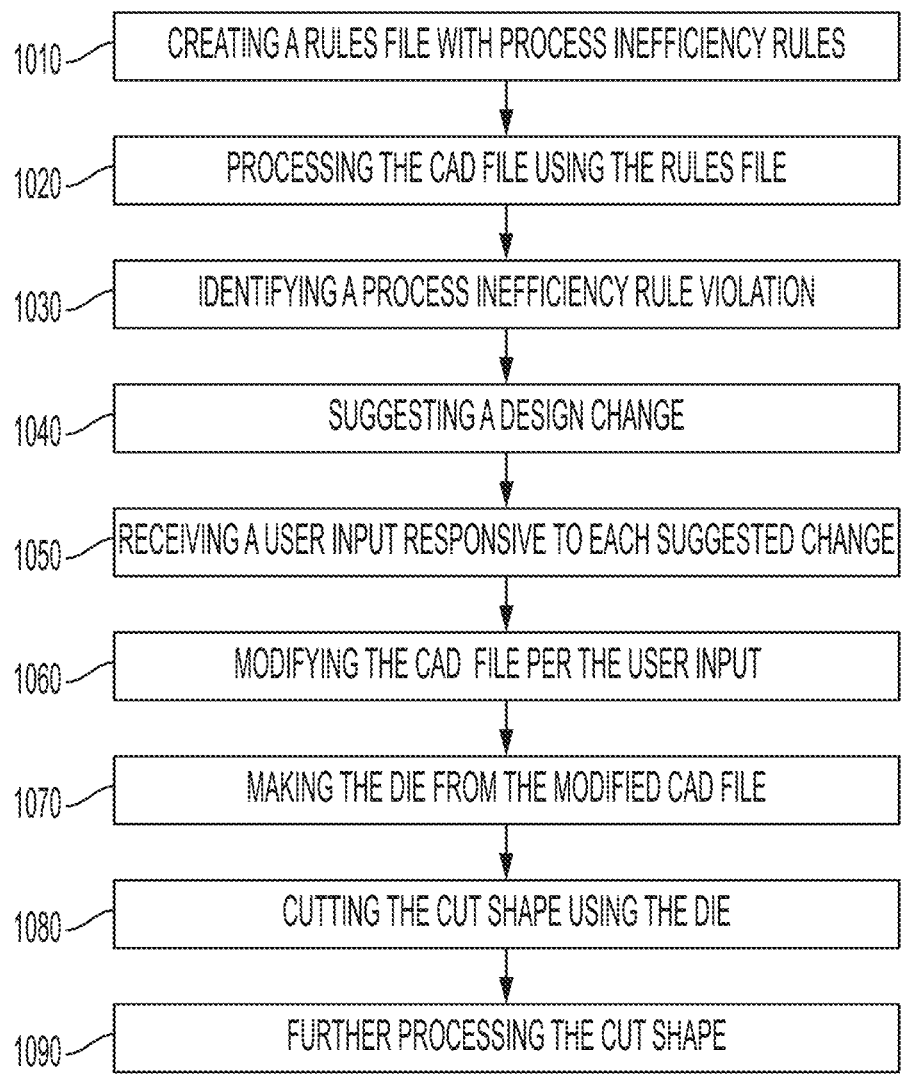
FIG. 10 is a flowchart depicting an exemplary method in accordance with an embodiment of the invention.
Figure 11:
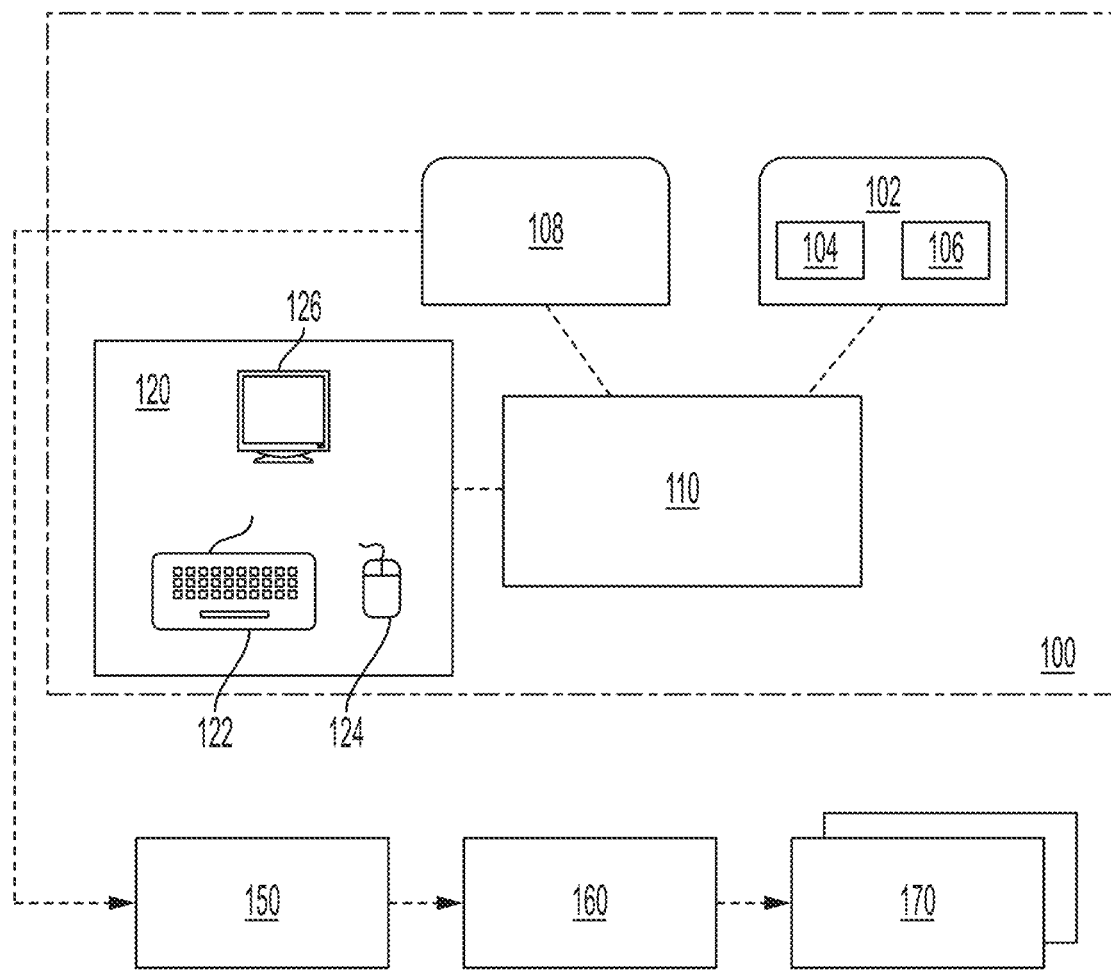
FIG. 11 is a schematic diagram of an exemplary system flowchart in accordance with an embodiment of the invention.

Referring now to FIGS. 10 and 11, the method comprises in step 1010 creating a rules file 102 that defines a plurality of rules 104, 106 applicable to CAD file 108. The CAD file may have any structure or format known in the art for recording a CAD file in computer memory in a format readable by a machine. The plurality of rules may include one or more anomaly detection rules 104, but as a point of novelty in accordance with embodiments of the present invention, include at least one process inefficiency rule 106. Each process inefficiency rule 106 corresponds to an inefficient geometry of a die that has some impact on die or dieboard manufacturing or reliability, or the cutting step, or a finishing operation downstream of the cutting step, or even an end-use operation by a consumer of the packaging. For example, a rule violation may increase the processing time of the sheet during a finishing operation (waste ejection, folding, gluing, etc.), increase manufacturing time of the die or dieboard, or decrease the reliability of the die or dieboard, or render the finished package inefficient for its intended purpose. The rules may be stored in a database file.

Step 1020 entails processing the CAD file 108 with a design rule checking (DRC) module 110 using rules file 102. If the DRC module identifies one or more violations of a process inefficiency rule in step 1030, it suggests at least one design change responsive to the rule violation in step 1040. Suggested improvements to address process inefficiency rule violations are preferably not automatically implemented, as there may be other reasons why the designer cannot deviate from the inefficient design or remedies for the inefficient design preferred by the designer of the suggested design change. More than one suggestion may be provided where there is more than one possible design change that may improve efficiency. For example, the steps of identifying the rule violation and suggesting the improvement may comprise providing to a user a textual description of the violation and how a change might improve the finishing operation. For example, the software may inform the user that "rounded corners would improve waste ejection and press performance."

Step 1050 comprises receiving a user input responsive to each suggested design change (i.e. accepting or declining the suggested change). The user input may be provided in the form of a selection indicated via a user interface 120 (e.g. a mouse/trackball 124 or other cursor controller, a touchscreen 126, or key stroke entered via a keyboard 122 (physical or virtual) or any type of character entry interface, including but not limited to speech-based interfaces and interfaces configured to accept instructions other than in form of keystrokes (e.g. tongue operated or eye operated devices for disabled users). For a suggested improvement for a process inefficiency rule violation, if a user declines to make a change in response to receiving notice of the violation, the system will not require a change before the user can complete the design rules check. The system may continue to note the process inefficiency rule violations in subsequent iterations, but may differentiate violations that have already been reviewed and declined, from those that are detected for the first time.

Then, in step 1060, the system modifies the CAD file 108 to reflect any suggested design changes (to fix geometric anomalies and finishing operation inefficiencies) authorized via the user input. The modified CAD file 108 may then be shared with a tool making system 150, such as a steel rule die manufacturing machine. The tool making system reads the modified CAD file 108 and, in step 1070, makes the tool (i.e. a steel rule die and backing plate) having the geometry dictated by the modified CAD file.

In step 1080, the tool (e.g. the die; backing plate) is used in a first step of a multi-step process for creating the article defined by the CAD file. In a package- or display-making operation, in which a sheet material is cut using a die, step 1080 comprises cutting a cut shape (or a plurality of cut shapes) using the die made in step 1070. In this step, the tool (e.g. the die) contacts the starting material (e.g. a panel of starting sheet material such as cardboard, plastic, or any material listed herein above or known for use in connection with a die cutting operation for packaging). In step 1090, downstream of step 1080, the article made in step 1080 is further processed by one or more downstream processing machines 170. In the case of a die cut shape, one exemplary downstream processing machines may be configured to score the cut shape(s), such as to create lines on which the shape will be folded in a later step or to create a glue-assist feature for holding glue. In other embodiments, at least some scored features may be created using the die in the cutting step. Another exemplary downstream processing machine (or module thereof) may be configured to fold the cut shape into a desired shape, and another may be for applying glue to one or more portions of the cut shape thereby creating a glued shape in which the folded configuration of the cut shape is set with an adhesive. The invention is not limited to any particular steps or processing machines or modules downstream of the cutting step, however, the universe of which is well-known to those of skill in the art.

It should be understood that the DRC module may also identify one or more violations of a geometric anomaly detection rule, and may also suggest a design change responsive to each violation of a geometric anomaly detection rule. While in some embodiments, the DRC module may automatically implement certain design changes to overcome violations of geometric anomaly detection design rules, it is generally more desirable to provide a suggestion that requires an affirmative election by a user. More than one suggestion may be provided where there is more than one possible modification that may overcome the violation. Unlike the case for a process inefficiency rule, for a suggested improvement for a violation of a geometric anomaly detection rule, if a user declines to make the suggested change, the designer may have to make some other change that addresses the rule violation before the user can complete the design rules check. The user may choose to address the violation in a different way, such as by making a change known to the design to overcome the problem in a way not suggested by the software.

In preferred embodiments, for each identified violation of a process inefficiency rule, the system may automatically provide to the user information regarding the impact of the rule violation and/or the impact of the suggested improvement. For example, the system may provide an estimated impact on the processing time of the sheet corresponding to implementation of the suggested design change. Information regarding the estimated impact may include an estimate of a production efficiency differential between the original design having the process inefficiency rule violation identified by the DRC module and the design improvement suggested by the DRC module. Such a differential may include, for example, an increase in production associated with the suggested design change relative to the original design, expressed as an estimated reduction of manufacturing time of the die or an estimated increase in package units produced per unit time. For example, the system may advise the user that the suggested improvement is expected to provide up to 100 units per hour more production from a single layout, or a percentage increase in throughput. Information about the estimated impact may also be provided in the form of a link to a storage location of an online instructional audio-visual file explaining the impact, such as a link programmed with a universal resource locator (URL) operative to retrieve an audio-video (AV) file from YouTube® or a similar repository of files. In the alternative, the AV file may be locally stored on a network, accessible from local storage media (e.g. a DVD or flash drive), or provided in any way known in the art, and may have any structure or format known in the art.

Computer system 100 operable to perform the method may comprise any computer equipped with a processor and operating system suitable for operating the CAD software comprising the rules checking module 110. The CAD file 108 and rules files 104 may be stored on any type of computer-readable media known in the art, including a hard drive, a flash drive, or removable digital media. The computer system comprises one or more devices such as a keyboard 122 and mouse 124, operable by a user to provide user inputs, and a display 126 (which may or may not be a touchscreen display capable of also receiving user inputs). The overall user interface 120 includes a graphical user interface (GUI) displayed on the display 126 that enables a user to see and create the design and select various types of operations typical to CAD software. The computer system may be implemented on a single machine, or the various components may be connected to one another over a computer network, including a local network or a global communications network in which, for example, files are stored or processing is performed "in the cloud." The software may be downloadable, non-downloadable, or a combination thereof, in which a "thin" portion resides on a user's local computer (which may include a tablet computer of other mobile device), and a more robust portion of the executable processing power resides on a server accessible via a computer network.

An exemplary commercial offering for ArtiosCAD 2D may be operable on a computer having at least an Intel® Core 2 Duo processor, with 2.4 GHz speed, 4 GB of Random Access Memory (RAM), and available hard drive space of 10 GM+1 GB on the C Drive. Preferred displays have at least 1024×768 resolution at 16-bit color depth. A connection to the Internet suitable for using the TCP/IP v4 communication protocol is preferred. Although the manufacture of steel rule dies typically requires only a 2D CAD file, the invention is not limited to the files for designing any particular type of tool, nor to any limitation upon the capabilities of the CAD system in which the novel DRC steps described herein are performed. Accordingly, the method and systems herein are also applicable to 3D CAD systems and methods. Versions of the software that include 3D capabilities and/or structured as enterprise editions may have additional requirements and/or recommendations, including faster processing speed, additional hard drive space, additional RAM, a graphics card and associated video drivers with suitable capabilities (e.g. at least 1 GB, with 2 GB+ preferred, and OpenGL and Direct-X video driver compliant), and faster Internet speeds. Preferred hardware may include Hewlett Packard (HP) machines preconfigured with Unified Extensible Firmware Interface (UEFI) firmware with a Legacy Basic Input/Output System (BIOS). The software may interface with a supported Databases, such as but not limited to various Microsoft® SQL Server (e.g. 2014, 2012, 2008, 2005 for 64-bit and 32-bit operating systems), and Oracle® (e.g. versions 9i or newer, including 12c) editions. Preferred Operating systems for the computer processor hardware include, but are not limited to various Windows® operating systems (e.g. Server 2016 Standard, 2016 Datacenter, 2016 R2 Standard, 2016 R2 Datacenter, 2012 Standard, 2012 Datacenter, 10 Pro, and 10 Enterprise versions).

As is known in the art, CAD files, such as 2D files corresponding to SRD designs, may be stored as a set of instructions that correspond to vector-based geometric definitions ("geometric vectors") of each line or feature in the file. The geometric vectors may be stored in computer code as, for example, as a line between a first beginning point and a second end point, or an arc having a defined centerpoint, radius, and beginning and ending points. The instructions corresponding to each line or feature may be stored in any data structure known in the art, such as for example, a tree data structure. Most of the design rules discussed herein can be distilled to a specific geometric definition that can be identified in the stored data corresponding to the CAD file.

Various algorithms may be defined for working within the data structure of the CAD file. Using, for example, a "follow algorithm," the software can follow along each line saved in the data structure, and consider its relationship with all other lines with respect to the set of design rules. For example, the follow structure may identify a second line that intersects the first line, calculate the angle between the two lines, and then identify any rules that include an intersecting angle between two lines for further review. That particular rule may have additional aspects, and the geometric relationship between the two lines may be further explored as to those aspects, once a threshold inquiry has been satisfied to trigger that further exploration. As another example, the follow structure may identify a second geometric feature spaced from the first line, and then check to see whether a space between the first line and the second feature meets a predetermined minimum spacing with respect to all aspects of the portions of the line.

As a way to speed processing time, the software may make a first superficial evaluation regarding relationships between the line being followed and all other lines, and excluding from further consideration any lines so far removed from the first line that no problematic geometric relationships indicative of a process rule violation are possible, and thus a more detailed evaluation is not needed. For example, if the starting point and ending point of the line being followed are more than a predetermined distance from the starting point and ending point of a second line to be considered, no mapping of the points between the starting and ending points need be conducted to determine whether the lines have a geometric relationship indicative of close spacing, or an intersection. After a first line has been subject to the "follow" algorithm along its full length, the software iteratively steps through the remaining lines in the CAD file until all lines have been checked relative to all other lines with respect to all rules selected for checking.

Figure 7:
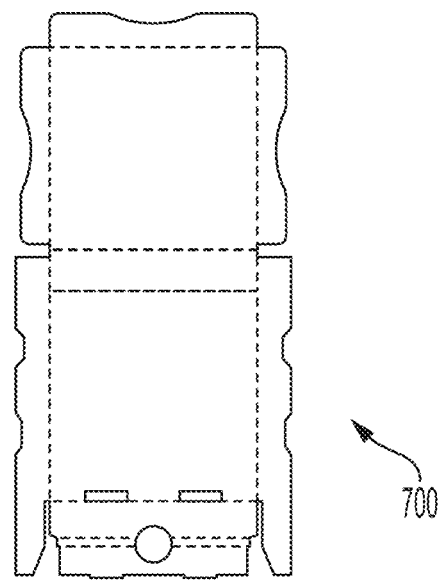
FIG. 7 is a schematic illustration of a two-dimensional design for an exemplary die cut pizza box in an isolated view.

The design rules checking operation as described herein may be operative to check CAD files in the nature of a design file that defines the periphery of a single package, such as is illustrated in FIG. 7, and/or a layout file that defines a plurality of peripheries nested on a single sheet, such as it illustrated in FIG. 8. The rules may be of any nature, but preferably include at least one rule corresponding to a waste stripping or waste ejection operation (i.e. ejection or expulsion of the waste material resulting from a cutting step at the die cutting station), a gluing operation, or a scoring operation relating to the package defined by the CAD file. Although detailed with respect to a CAD file relating to a steel rule die, it should be understood that the methods and systems as described herein may be relevant for use in designing any tool for use in any process, wherein rule violations may create inefficiencies in the process for use of the tool, but do not render the tool inoperable or corrupt the process for making the tool.

Embodiments are discussed below in additional detail. Rules subject to design checking may relate to any aspect of a die cutting operation. Some rules may correlate to specific aspects of production. For example, a rule may dictate that the size of the panel (i.e. the sheet to be cut) must match the size capable of being processed on the production machine. At least some applicable design rules may be set by a user input of the relevant production machine (e.g. such as choosing it from a menu of applicable machines). Selection of the production machine may then cause certain rules and corresponding parameters to be enabled as a preset. Other production rules may include "overrun" (where the design or layout does not fit on the panel) or "underrun" (where the layout does not efficiently use all of the space available on the panel). These properties should not be confused with an overrun anomaly that occurs when a line extends slightly beyond the point at which it intersects another line, or an underrun anomaly that occurs when an endpoint of a line falls slightly short of the intersection of the line with another line, which is within the capability of some prior art CAD software (e.g. ArtiosCAD, as described above) pursuant to "routine" DRC operations.

"Short lines" may indicate lines that are smaller than a minimum line size, and "zero-size" may indicate lines that the user either intended to be larger, or intended to have deleted entirely, the presence of which may cause the die production unit to freeze. "Lines in the wrong layer" result when a designer may inadvertently place a feature in the annotation layer of a drawing, which is ignored by downstream conversion of the drawing into a physical die.

Figure 1:
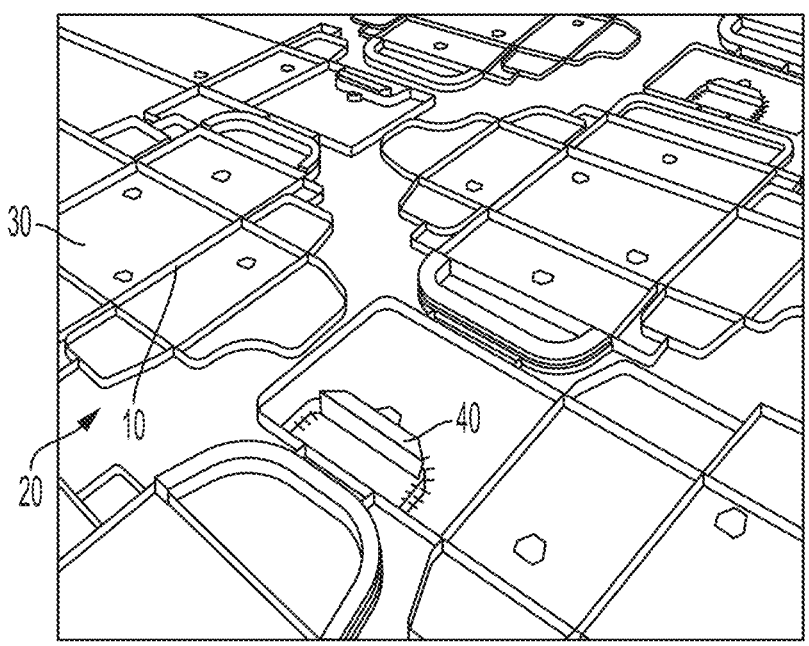
FIG. 1 is a photographic image of a plurality of dies for cutting sheet media arranged in a layout configuration.
Figure 2A:
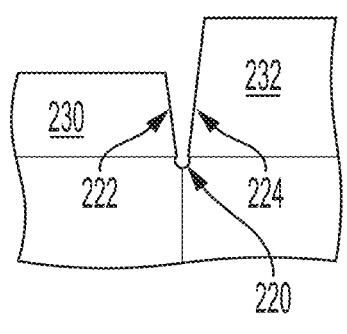
FIG. 2A is a schematic illustration of a cut shape having desirable properties with respect to an exemplary design rule.
Figure 2B:
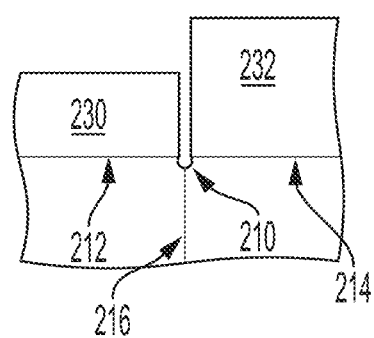
FIG. 2B is a schematic illustration of an exemplary cut shape having undesirable properties with respect to an exemplary design rule, capable of being improved by adopting the design depicted in FIG. 2A.
Figure 3A:
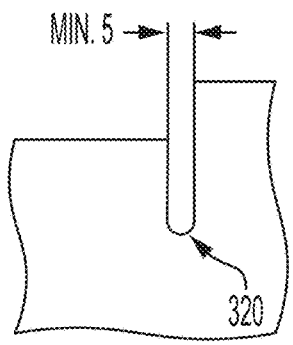
FIG. 3A is a schematic illustration of a cut shape having desirable properties with respect to an exemplary design rule.
Figure 3B:
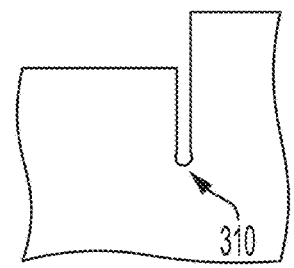
FIG. 3B is a schematic illustration of a cut shape having undesirable properties with respect to an exemplary design rule, capable of being improved by adopting the design depicted in FIG. 3A.

Other rules may relate to press performance. For example, rules may define a minimum distance between adjacent steel rules in the die, or where the end of a rule may be located. For example, as shown in FIGS. 3A and 3B, a design rule may require a minimum space of 5 units (e.g. millimeters) between the rules that are used to cut the media, for maximum efficiency. Thus, slotted shape 310 shown in FIG. 3B that does not conform to the efficiency rule may be fixed by implementing a suggested design change to a larger slot shape 320 with the subject lines spaced at least 5 mm apart. In a different configuration, depicted in FIGS. 2A and 2B, where a similar slot shape 210 defines two flaps 230, 232 at an intersection of a plurality of crease lines 212, 214, 216, the preferred suggested change may utilize a tapered slot 220 in which the two sides 222, 224 of the slot diverge as they extend away from the intersection, thus defining each flap 230, 232 as an isosceles trapezoid rather than a rectangle or square. In contrast to a design rule defining to a first, mandatory minimum spacing of steel rules in a die required to permit manufacture and operability of the die, the minimum spacing rules illustrated in FIGS. 2A-3B relate to a second, greater, minimum spacing that, if observed, is predicted to increase throughput in a finishing operation downstream of the cutting operation in multi-step process for making the package.

Figure 6A:
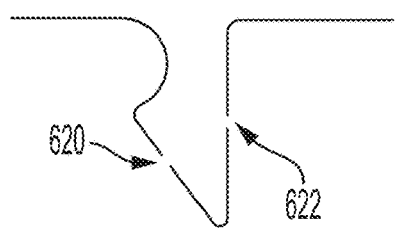
FIG. 6A is a schematic illustration of a die configuration having desirable properties in accordance with an exemplary design rule.
Figure 6B:
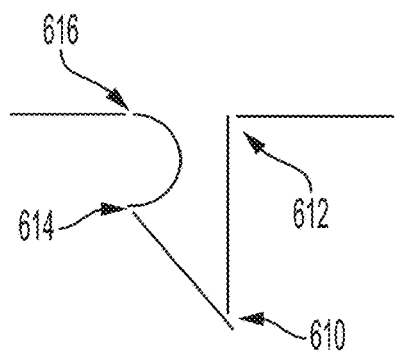
FIG. 6B is a schematic illustration of a die configuration having undesirable properties with respect to an exemplary design rule, capable of being improved by adopting the design depicted in FIG. 6A.

As shown in FIGS. 6A and 6B, a design rule may require that the end of a steel rule not be located at corner 610, 612, 614 or inflection point 616, because the discontinuities in the cuts on the sheet in such locations may lead to inefficient stripping operations. Suggested improvements may relocate the breaks or ends of the rule to locations (e.g. 620, 622) within a straight run, as shown in FIG. 6A.

Figure 4A:
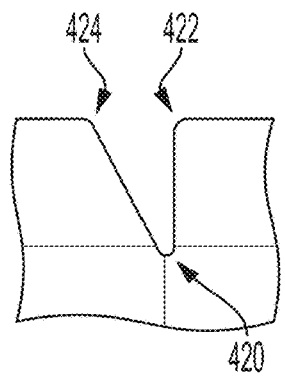
FIG. 4A is a schematic illustration of a cut shape having desirable properties h respect to an exemplary design rule.
Figure 4B:
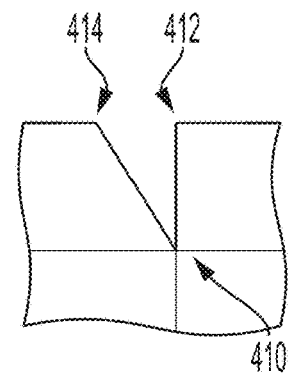
FIG. 4B is a schematic illustration of a cut shape having undesirable properties with respect to an exemplary design rule, capable of being improved by adopting the design depicted in FIG. 4A.
Figure 5A:
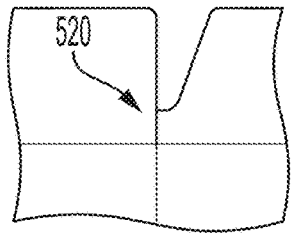
FIG. 5A is a schematic illustration of a cut shape having desirable properties with respect to an exemplary design rule.
Figure 5B:
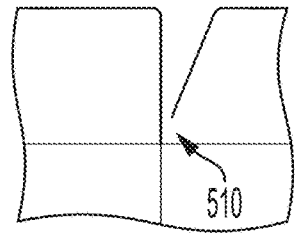
FIG. 5B is a schematic illustration of a cut shape having undesirable properties with respect to an exemplary design rule, capable of being improved by adopting the design depicted in FIG. 5A.

As another example, as shown in FIGS. 4A and 4B, sharp corners 410, 412, 414 may be inefficient for a downstream waste stripping or waste ejection operation, but may be improved by using rounded corners 420, 422, 424, respectively. Likewise, as depicted in FIGS. 5A and 5B, an acute relationship between almost-intersecting lines that creates an undefined sharp corner 510 may be made more efficient for stripping by creating a rounded corner 520 at which the two lines fully intersect. While the rules illustrated in FIGS. 2A-6B are generally known in the art, these rules have not previously been embodied in automated preflight checking programs.

The design rules for use in a preflighting operation implemented by the DRC module of embodiments of the invention are not limited to those described above, and may include any number of geometric anomaly detection and process inefficiency rules. Exemplary rules may include the following, which will be understood to those of skill in the art:

Production
    Overrun/underrun, short lines, lines in wrong layer, zero-size
    Panel dimensions match production machine
    Press performance
    Distance between rule, end of rule, bridging (MFG)
    Min radii, min hole size, min rule length, sharp corners, narrow slots
    Internal cut lines not closed (slits)
    Rule pointage for board, pointage consistency, rule density
    Min waste area (MFG)

Design/Product Quality
    Handling intersecting lines (open features)
    Distance between parallel lines (folding)
    Slot offset from crease (folding)
    Cut lines in glue flap, min glue area Imported Files
    Double lines, gaps, overrun/underrun, multi-segment lines, Bezier segments
    Correction/edit tools for above errors Process Checks
    BOM check
    Customer specific requirements Novel additions to routine CAD preflighting or DRC operations, as implemented by embodiments of the present invention, focus on press performance, more robust die boards and better folder-gluing. For example, DRC embodiments of the present invention check against design rules relating to slots of different widths and shape for better waste expulsion off the press, and therefore increased production speed. Examination of glue tabs may focus on providing glue assistance features that penetrates but do not fully perforate (e.g. extending from a top surface to a bottom surface of the cut shape) the material instead of knife features that fully perforates the material, which may cause glue to seep through and stick to rollers in the press, ultimately causing finished cartons to stick together when stacked.

Examples of process inefficiency rules relating to dieboard stability, a design may have a feature that requires a first steel rule to terminate intentionally short of an intersecting steel rule (such as a crease to cut) by a small dimension X. If X is too small, a small strip of wood may be left in the dieboard that is subject to breakage under high pressure. Accordingly, the rule may specify a minimum value for X (e.g. ⅛ inches or 3.2 mm).

Similarly, parallel steel rules may need to be a certain dimension apart to avoid leaving a thin piece of wood between the parallel rules that can break under high pressure. Glue assist lines may have a minimum dimension (e.g. ⅛ inches or 3.2 mm) to avoid thin wood pieces, also. Parallel perforations (e.g. the opening feature on a tissue box) may permit closer rules with no rubber needed (e.g. between parallel rules), but may still define issuance of a warning. In the case of a construction in which both rules go into one slot in the die with a spacer lead in between, spacers are only available in multiples of 1 point (0.014 inch; 0.35 mm), and a rule may be implemented to ensure the spacing is consistent with availability of spacers. A more serious warning may be issued for a rule violation where the spacing does not confirm to a standard size spacer. The minimum dimension may be dependent upon the steel rule type (e.g. cut, crease, perforation), the caliper or construction of sheet material to be cut (e.g. double-wall corrugated, quad-wall corrugated), and/or the type of die cutting operation (e.g. flatbed or rotary).

The density of steel rules within a unit area may have a minimum value, such as when cutting corrugated material, to avoid too many cuts that may compromise the fluting strength in a defined area. The pointage (thickness) of the steel rules for cutting and creasing may each be set to a consistent size for a given material caliper, and that size may be dependent upon the type of material (e.g. pointage for creasing corrugated may be greater that for creasing another type of material). The steel rule for an embossing feature may have a different pointage than a creasing feature.

Figure 12:
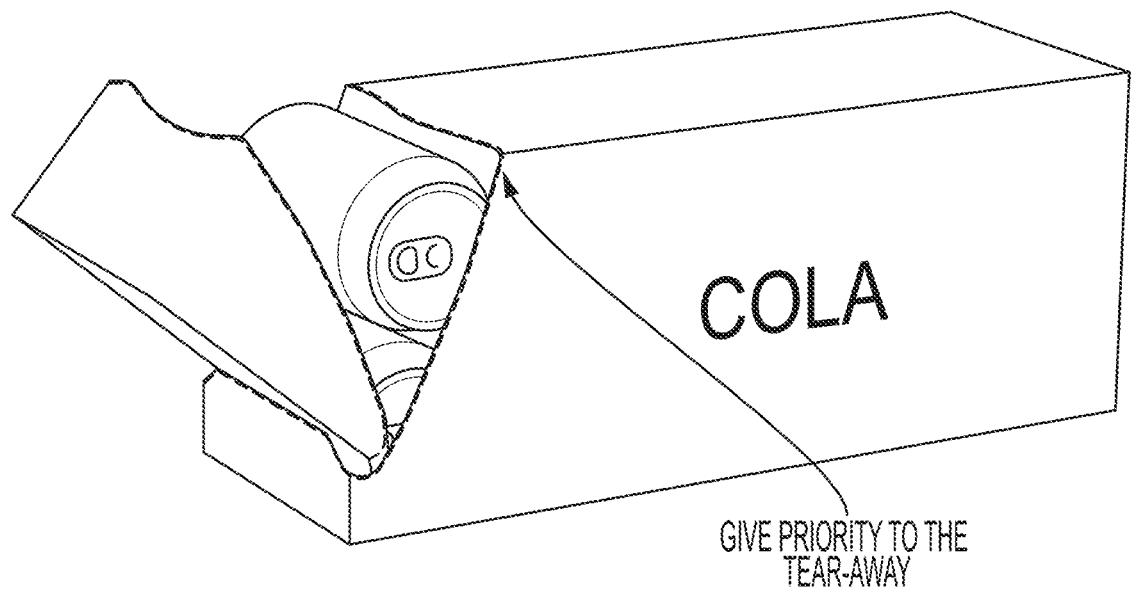
FIG. 12 is a schematic diagram of an exemplary package with a tear-away feature, to illustrate an exemplary design rule applicable to embodiments of the invention.
Figure 21A:
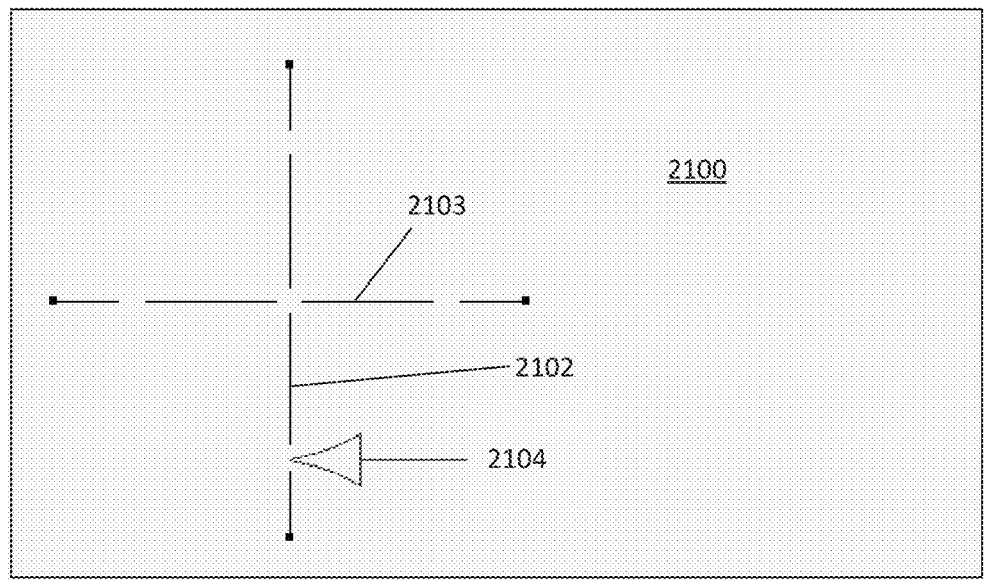
FIG. 21A is an illustration of a dieboard having slots and bridges.

Other rules may relate to how to break intersecting straight lines in the design, and such rules may have priorities based on end user efficiencies. For example, as illustrated in FIG. 12, for a refrigerator package for a 12-pack of soda, for example, the opening feature takes priority to ensure the user can separate the package at the perforation. A normal perforation rule may avoid having a perforation span a crease, but for this type of design, having the perforation span the crease is desirable. Accordingly, applicable rules may have hierarchies based on their end use. The software may permit the user to set the hierarchies, and may provide a warning showing all of the rules and the set hierarchy, to permit the user to select the preferred option with full information (as in some instances, the user may have a reason for overruling the default hierarchy). Another rule may specify that when splitting, not to create a bridge on a resulting line of a split that is too small (split lines at T junctions, if the shorter piece would normally get a bridge). For example, as illustrated in FIG. 21A, the intersection of lines 2102 and 2103 shows a bridge at the intersection. However, as a practical matter, if the rule that fills slot 2102 is continuous, it may have a bridge at the intersection (or in some other location), but two rules will fill slot 2103 (one on each side of the rule that fills slot 2103). Accordingly, the design rule may flag the bridge depicted in slot 2103 as inefficient, because such a bridge would create an instability at the ends of the rules on either side of the rule that fills slot 2102. The suggested design change may eliminate such bridges, or relocate them.

Figure 21B:
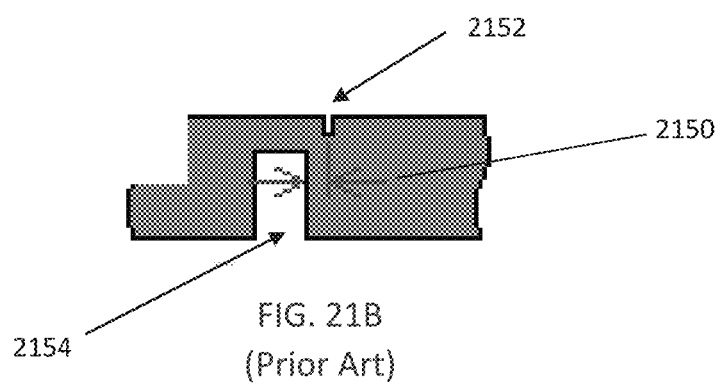
FIG. 21B is an illustration of a portion of a rule having a bridge and a nick.
Figure 21C:
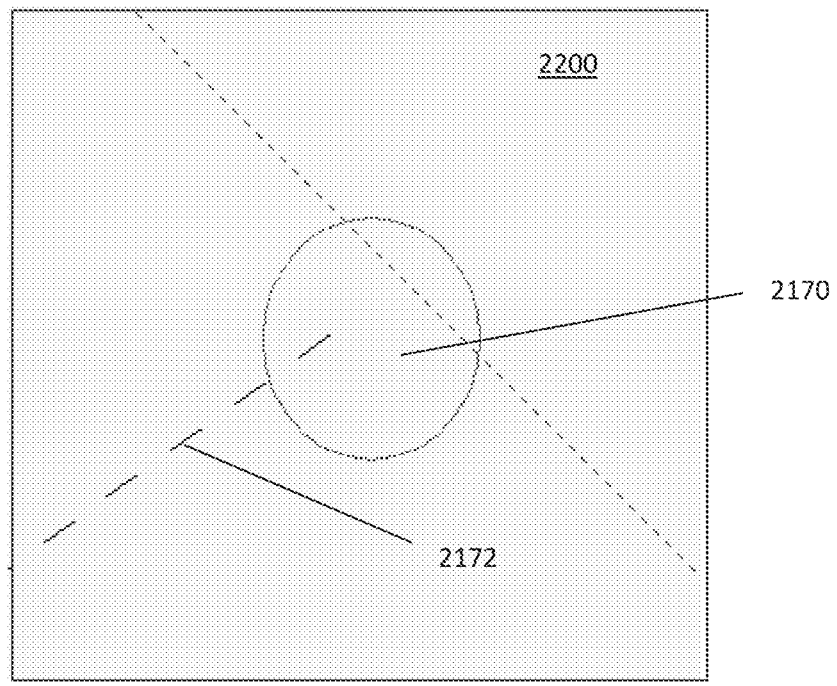
FIG. 21C is an illustration of a portion of a dieboard showing land at the end of a special rule.

A rule may specify providing a crease at the end of a perforation in a channel, because land >3/16" does not fold. A "zipper" rule (for any combination of rule, perforation, cut/crease), a design rule may specific that the land length cannot be longer than the pattern allows. The last tooth of the perforation may need to be a separately cut rule (which may be too small for a bridge). Another design rule may prevent a nicks from being placed too close to a bridges (i.e. "a" as depicted in FIG. 21B may need to be greater than a certain value), as otherwise the design may provide a weak, thin, strip of rule between the nick and the notch in the rule for the bridge which can break under pressure.

Figure 13:
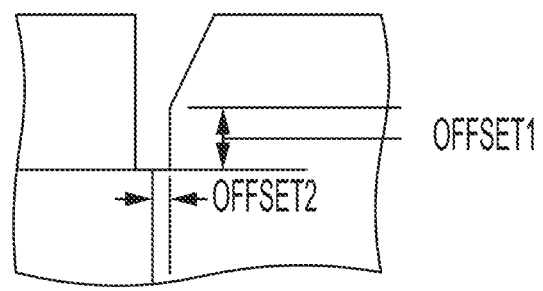
FIG. 13 is a schematic diagram of an exemplary efficient flap design near an intersection of crease lines.
Figure 21D:
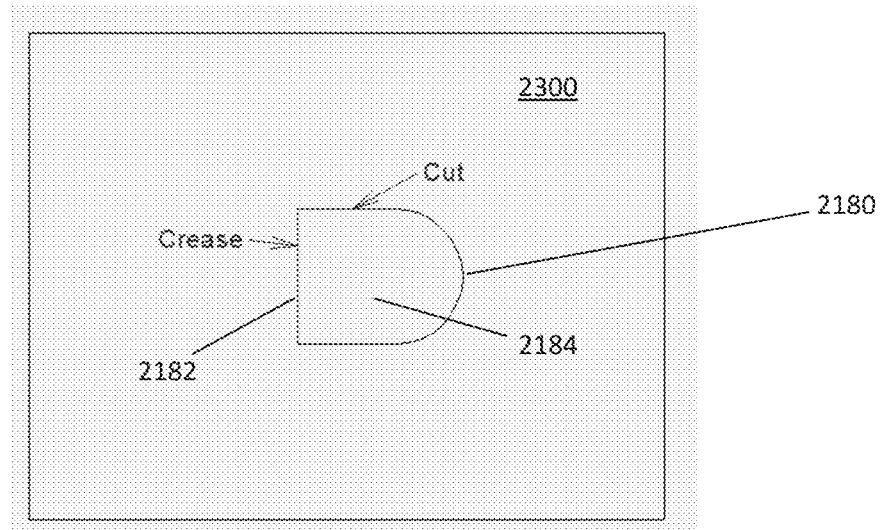
FIG. 21D is an illustration of a portion of a cut sheet showing a tab and a crease.

Other rules may relate to flatbed press performance and speed. For example, a first minimum radius may be specified (which may be dependent upon caliper of the material to be processed) for corners, and a second minimum radius (or diameter) for internal holes. A rule may specify that internal cut lines that are not closed (e.g. a hole or, as depicted in FIG. 21D, tab 2184 that folds on crease 2182) should have one or more nicks (e.g. along line 2180), at least when cutting a material having a caliper <C, to prevent a resulting flap from shingling or jamming during downstream process operations. As noted above, sharp corners may be identified and suggested for replacement by a radius (of minimum size or greater). In general, sharp corners may result in the splitting or cracking of material, and may result in unwanted nicks, which keep the waste attached to the sheet and may be inefficient in a waste ejection finishing operation. In addition, with respect to manufacture of the die, it is easier to bend a steel rule with a radius than to create a sharp angle. Moreover, from a durability standpoint, corners where two rule meet are inherently provide a weaker joint (vs. a radius), with a higher risk of knife deflection. The design rule change may be different for rotary presses versus flatbed presses. For example, in a rotary operation a sharp angle of A (e.g. 30 degrees) or less may require a minimum radius of R (e.g. 3 mm). Angled cuts at fold line intersections, for certain types of machines, may benefit from a specific geometry that provides a lateral setoff from each of the fold lines before angling. See, e.g., FIG. 13. In general, to facilitate waste ejection, conical shapes are favored, and thus the inefficiency rules may look to identify a hole shape such as is shown in FIG. 14B with alternative shapes such as those illustrated in FIG. 14A, or a notch such as is shown in FIG. 15A, with the shape shown in FIG. 15B. Some features, such as those shown in FIGS. 15A and 15B may be particularly applicable for rotary die cutting, and the direction of flare may depend upon the direction of rotation of the rotary press.

Other design rules that may impact press efficiency may identify a caliper of the material to be cut that exceeds the maximum or is less than the minimum design size for the press to be used. Some rules may be specific to the feedstock and press. For example, for certain presses for cutting corrugated cardboard, the spacing between rules should not be less than the flute pitch F of the corrugated medium.

Figure 19A:
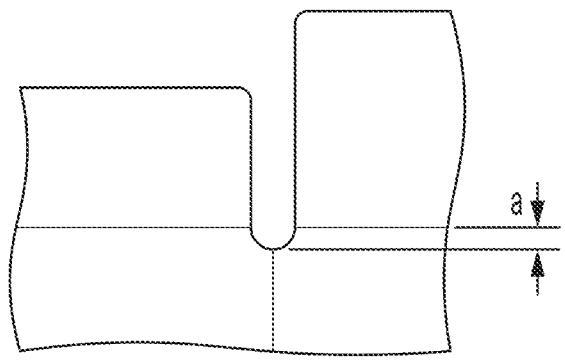
FIG. 19A illustrates one implementation of an efficient configuration of a slot terminating at an intersection of crease lines.
Figure 19B:
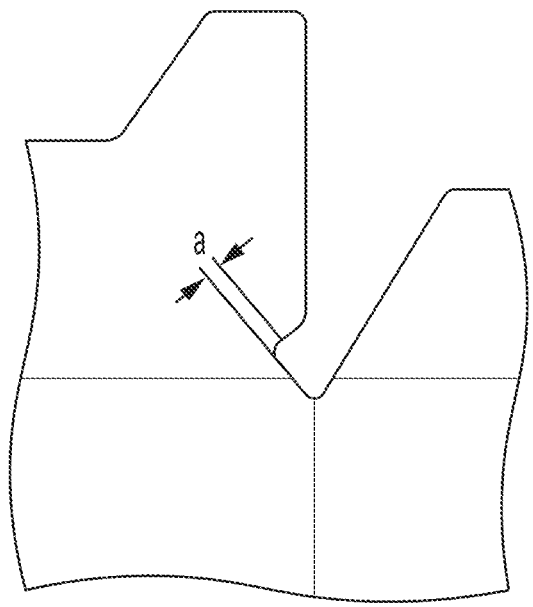
FIG. 19B illustrates another implementation of an efficient configuration of a slot terminating at an intersection of crease lines.
Figure 20A:
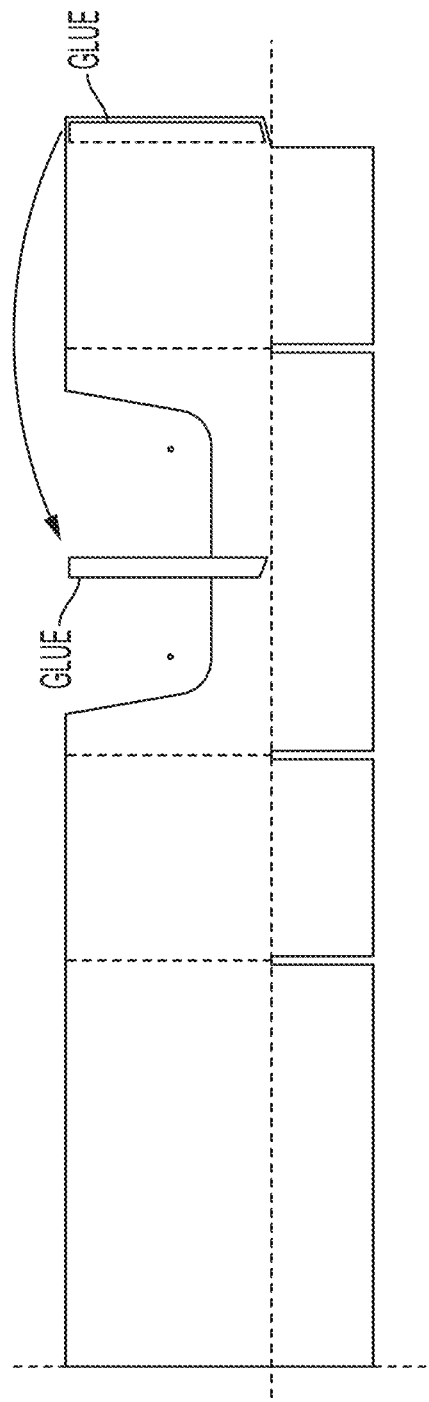
FIG. 20A is an illustration of a cut shape in an unassembled configuration having an inefficiency in alignment of a glue tab relative to a window.
Figure 20B:
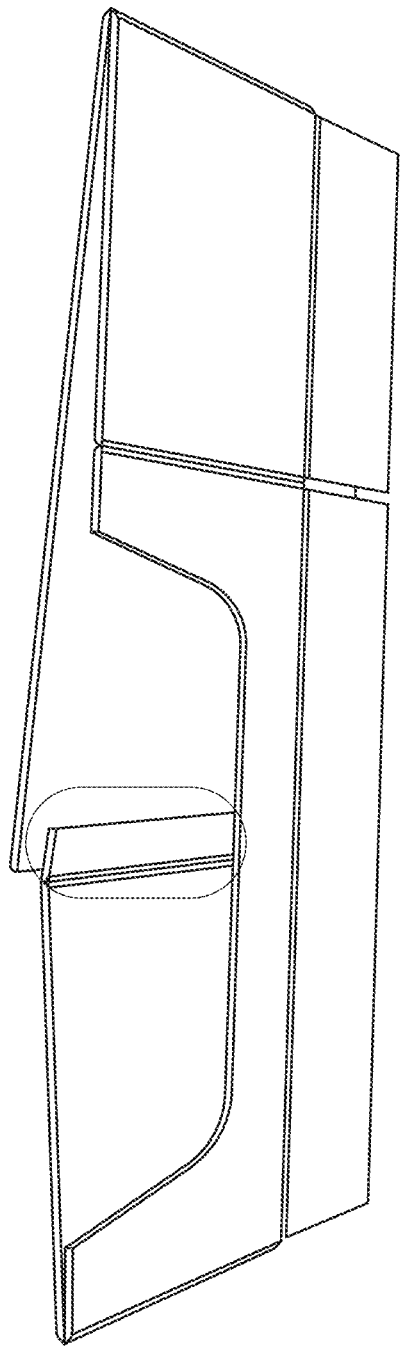
FIG. 20B is an illustration of an alternative, more efficient design corresponding to the cut shape of FIG. 20A, in an assembled configuration, with the glue tab relocated relative to the design of FIG. 20A.

Some design rules may relate to finishing operations further downstream, such as an assembly operation or folder/gluer. For example, an inefficiency rule may comparing interfacing slit and pin sizes to ensure the slot length is sufficiently large enough to accept the pin for insertion therein efficiently. As illustrated in FIGS. 19A-19C, a rule may specify that slots project slightly beyond creasing lines by a certain distance "a" for a given caliper of material to make folding and gluing easier. The value "a" may have a default size expressed as a ratio of the material caliper (e.g. 1:1), or may have a default size that is caliper independent (e.g. 1.5 mm or 0.5 mm), and may be press-dependent. Certain geometries of features may be preferred based on the process equipment (e.g. round or oval rather than square or rectangular internal holes). A rule may specify a minimum distance between parallel cuts or other lines to facilitate correct folding. As noted above, a rule may specific that glue assist features penetrate but do not perforate the substrate to prevent glue seepage that may cause cartons to stick to one another or leave residue in the process equipment. A rule may also specify a minimum glue tab size, which may be based upon the caliper of the sheet material to be cut, and may be more strongly recommended for certain types of material (e.g. double wall materials). A rule may specify that a perforation that crosses a glued flap (e.g. for a tear away opener) is a partial cut perforation (not completely through the thickness of the material, to prevent glue seepage. A rule may specify that the alignment of a glue tab and corresponding panel do not lie in a windowed region, as they do in the illustration depicted in FIG. 20A, because the window knock-out provides no glue support, and poor or no bonding may result. Instead, as shown in FIG. 20B, one solution is to move the window to an alternate panel. Another option would be to nick the window for its removal during packing by the customer (not shown), or to a use a different design with a fully diecut rather than partially diecut window (not shown). The DRC process may suggest multiple options.

Figure 18A:
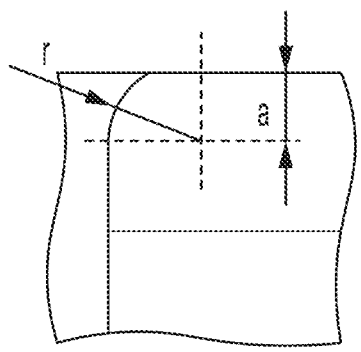
FIG. 18A illustrates an exemplary efficient design for an intersection of an arc and a straight line in an exemplary implementation of the invention.
Figure 18B:
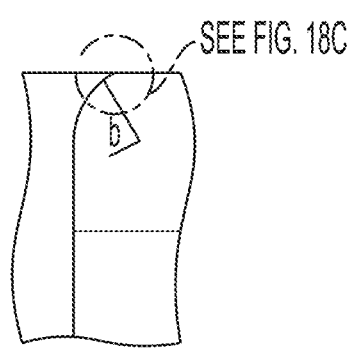
FIG. 18B illustrates the design of FIG. 18A with an additional supporting steel rule die added for increased efficiency.
Figure 18C:
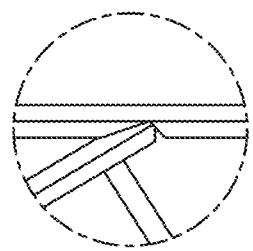
FIG. 18C is a magnified illustration of a highlighted area of FIG. 18B.

Some design rules may suggest the addition of supporting steel rules in the design. For example, as shown in FIG. 18A, a tangent connection of a radius on a straight rule may be very difficult to execute, and may prompt a recommended design change to center the arc with radius "r" at a distance "a" smaller than the value of "r." As illustrated in FIGS. 18B and 18C, the addition of another steel rule "b" may be recommended for an even more efficient design, to support the cutting rule to avoid leaving a natural nick at the intersection of the radius and the rule.

Figure 17A:
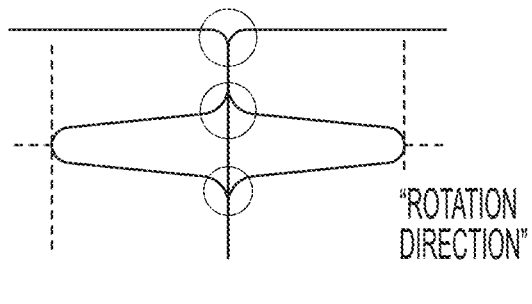
FIG. 17A illustrates an exemplary inefficient mating of flaps in a layout configuration for cutting with a rotary cutter in an exemplary implementation of the invention.
Figure 17B:
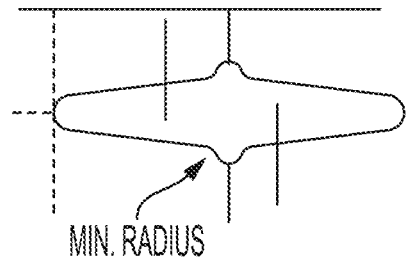
FIG. 17B illustrates an exemplary efficient mating of flaps in the layout configuration corresponding to FIG. 17A.

Some design rules may be applicable to the layout configuration when multiple individual cut shapes are laid out to be cut from a single sheet. For example, as shown in FIG. 17A, cuts with tangent rounded edges adjacent to one another may create an angled waste piece with sharp points, but can be avoided by inserting a minimum radius in lieu of the point, as shown in FIG. 17B.

Still other design rules may be based upon the specifications and capabilities of downstream equipment. For example, converting equipment is typically used for "regular slotted carton" (RSC)/"brown box" designs. An RSC has certain blank sizes, panel dimensions, etc. A company may have certain converting equipment with varying capabilities scattered among different plants. A design rule may be implemented to help a designer or customer service representative (CSR) or estimator, match the resulting design with machines in the company regardless of plant and ensure some machine can handle the design. In most cases, structural designers have no idea where the box will be produced. So ensuring the company has the ability to produce the box among a number of machines is needed as well as allowing the estimator/CSR/scheduler, to route/schedule the design to the proper plant. Therefore, for example, the minimum/maximum sizes of converting equipment available may be stored in the computer memory, so that the user can be notified of slitters/scorers within the company that can accommodate the design and receive a notification if the company is not capable of processing the RSC through its set of slitters/scorers. For example, some equipment cannot perform certain operations (e.g. reverse creasing, offset scorers cannot make scores in straight runs). Panel sequences and sizes of the RSC are determined and evaluated against the set of slitter/scorers capable of accommodating the job. Glue flap size may be evaluated to determine if it is in a required range and sufficient for the material. Thus, the software may have a dialog with a user during set up to enable specification of equipment or set of equipment on which the design will be produced.

Exemplary violations of process inefficiency design rules and corresponding suggested design changes responsive to those violations are set forth in Table 1.

The invention is not limited to the rule violations or the corresponding suggested changes as set forth in Table 1. Embodiments of the invention may feature some, none, or all of the following rule violations and some, none or all of the following suggested changes, and/or one or more of the following rules with a different corresponding suggested change. Thus, the table is intended only to be illustrative, and non-limiting. Furthermore, it should be understood that for each violation as expressed in the Table 1, a corresponding rule is objectively defined in machine-readable code that expresses geometric relationships and parametric values corresponding to elements of the design.

Figure 9:
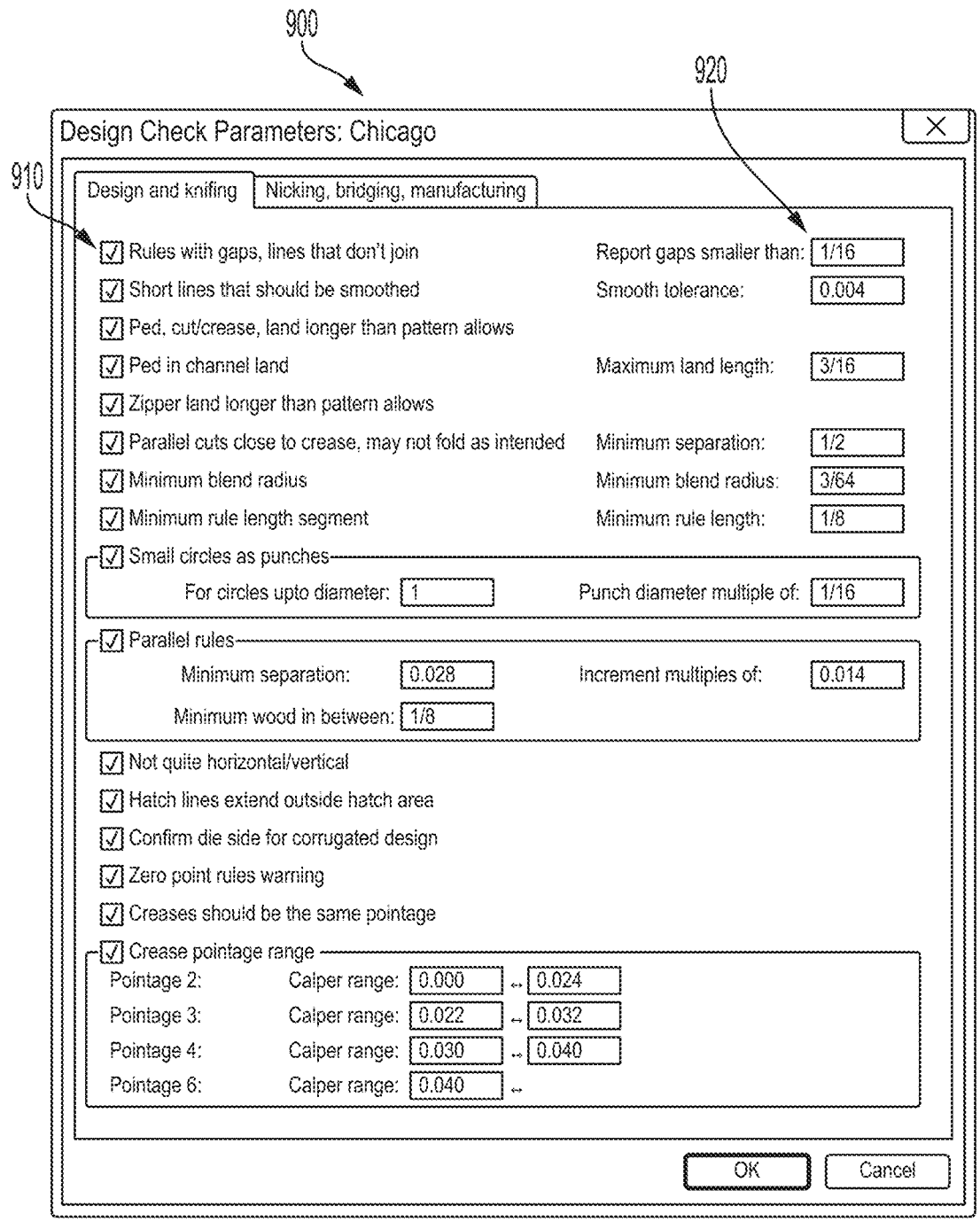
FIG. 9 is an exemplary user interface comprising interactive user options for selecting rules to be applied and providing parameters for selected rules.

A preflight menu/dialog may be included in a graphical user interface (GUI) for the software, such as the exemplary GUI 900 depicted in FIG. 9. The user may be able opt in or out of whether some rules apply or do not apply by checking a box 910. Other portions of the GUI, such as fields 920, may permit a user to define parameters corresponding to the selected rules. For example, selection of box 910 depicted in FIG. 9 results in application of a design rule looking for [Steel Die] "Rules with gaps, lines that don't join," and gives the user the opportunity to set the gap size to be reported in field 920 (e.g. "Report gaps smaller than $\frac{1}{16}$," with $\frac{1}{16}$ being the defined parameter). The defined parameter may be a value selected from a dropdown menu of options (not shown, but well known in the art) or the user may be permitted to fill in any number, or any number in a range of numbers to a specified level of precision, depending upon the type of rule. The GUI 900 allows users to configure device profiles to adjust for a specific device or environment, and may include other pages for selection of the type (e.g. brand and model number) of machinery in the process, size of the sheets, and sheet material composition and thickness (e.g. 2 mm corrugated cardboard).

EXAMPLES

As an example of how embodiments of the present invention may provide value to a user, FIG. 7 illustrates the periphery 700 of an exemplary die cut shape for a pizza box. The design of the pizza box as a standalone unit may be perfectly acceptable, may meet all customer requirements, and may be fully operable as needed to provide a ready-to-assemble, sturdy pizza box. The design illustrated in FIG. 7 may be capable of manufacture in a die cutting environment using a SRD at a rate of about 1500-2000 units per hour.

Figures 8A, 8B:
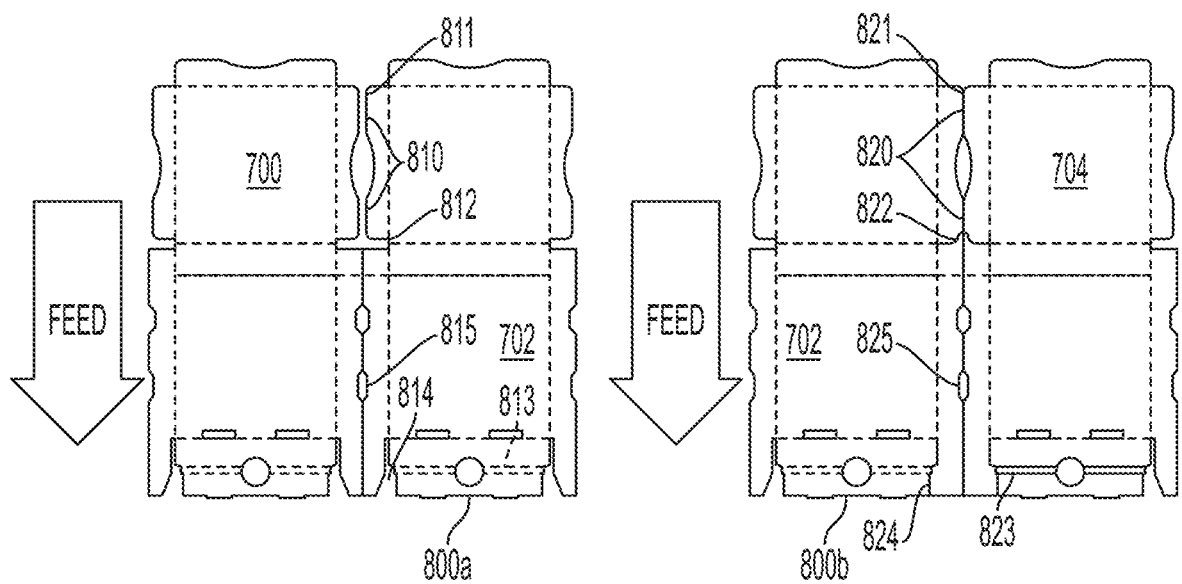
FIG. 8A is a schematic illustration of a plurality of the designs of FIG. 7 disposed in a layout view, before making changes suggested by a design rules check.
FIG. 8B is a schematic illustration of the plurality of designs of FIG. 8B, after modification of the designs in accordance with changes suggested by a design rules check.

As understood by those of skill in the art, a plurality of individual package structures are frequently laid out on a single sheet of media for cutting, as illustrated in the layout of three such structures 700, 702, and 704 in FIGS. 8A and 8B. Structure 700 corresponds to the original design prior to a DRC step. Structure 704 corresponds to an exemplary modified design after the DRC step. Structure 702, presented here for illustrative purposes only, has the periphery of structure 700 on its left side and the periphery of structure 704 on its right side, to illustrate the difference between an interface between adjacent peripheries corresponding to structure 700 and adjacent peripheries corresponding to structure 704. FIG. 8A illustrates the "Before" design, showing the interface between the periphery of structure 700 and the left side of the periphery of instance 800a of structure 702 before conducting a design rules check in accordance with an embodiment of the present invention. FIG. 8B illustrates the "After" design, showing the interface between the periphery structure 704 and the right side of the periphery instance 800b of structure 702 after implementation of suggested design changes ("improvements") A-F. The resulting modified layout comprising shapes having the geometry of structure 704 may, for example, permit manufacture in a die-cutting environment at a rate of about 6000 units per hour, as compared to the 1500-2000 for the original layout comprising shapes having geometry 700.

For example, before implementation of design changes, area A of the layout results in $\frac{1}{8}$" slots 810 between adjacent designs in the layout, which may lead to issues stripping the waste after cutting. Likewise, area C before implementation of design changes creates slots 812 both with respect to the individual design, and with respect to side-by-side designs in the layout. Area E, before implementation of the design changes, creates slots 814 only with respect to the individual design. Accordingly, the design rules checker may suggest improvements to modify the design to omit all of these slots 810, 812 and 814 in favor of cut lines 820, 822, and 824, respectively. Area B of the layout, before changes to the design, features rounded corners 811, which the design rules checker may suggest replacing with 45-degree corners 821, which are easier and cleaner to cut. Area D shows a perforation 813 in the original design 700 for which the suggested design change is to create a score 823, as scores can be made more quickly than perforations during manufacture. Area F illustrates a slot 815 that arises where features of adjacent shapes come together in the layout, but to make waste stripping or waste ejection easier, the design checker may suggest making a design change to the shape that results in an increased slot width 825 between adjacent designs in layout mode. Collectively, making all of the foregoing changes may increase throughput three- to four-fold. Again, while the rules underlying these types of changes are generally known in the art, such rules have not previously been embodied into automated design rules checking software, along with the other novel features of the invention as described herein.

Exemplary User Interface

Figure 22:
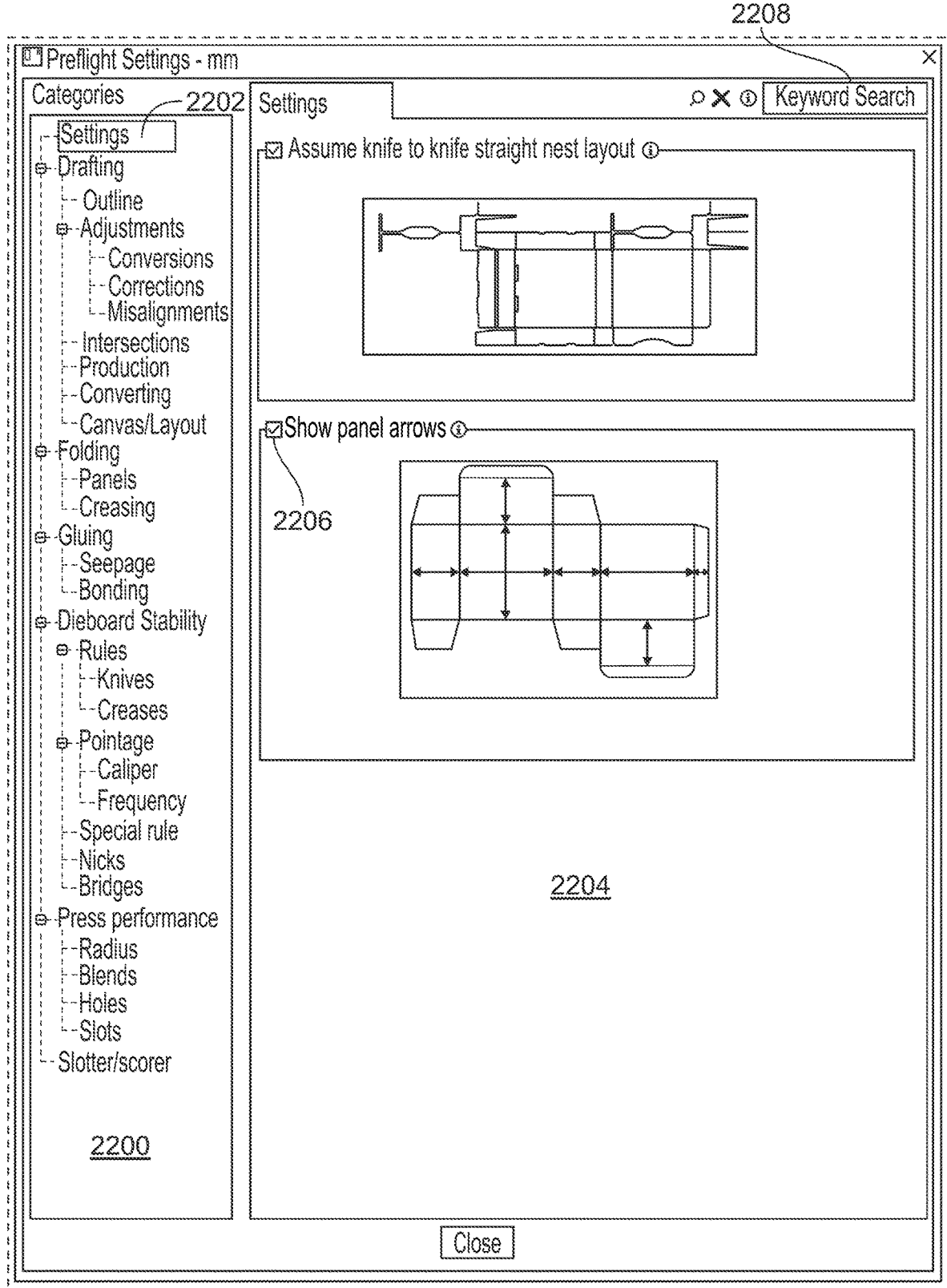
FIGS. 22-46 are illustrations of exemplary user interface display screen content via which a user may select rules, and attributes thereof.

FIGS. 22-46 provide illustrations of exemplary user interface display screen content via which a user may select rules, and attributes thereof, to be implemented by an exemplary design rule-checking module in connection with an embodiment of the methods and systems as described herein. As depicted, for example, in FIG. 22, the user interface includes a menu 2200 in the left column that lists the various screens by name, and the rightmost area displays the screen corresponding to the darkened block 2202 that highlights the name of the screen in the left column. Each screen, such as the settings screen 2204 depicted in FIG. 22 includes one or more check boxes 2206. A checked box indicates the rule or setting is in effect; an unchecked box indicates the rule or setting is not in effect. A search field 2208 permits the user to search for a keyword corresponding to a rule or setting of interest.

Figure 23:
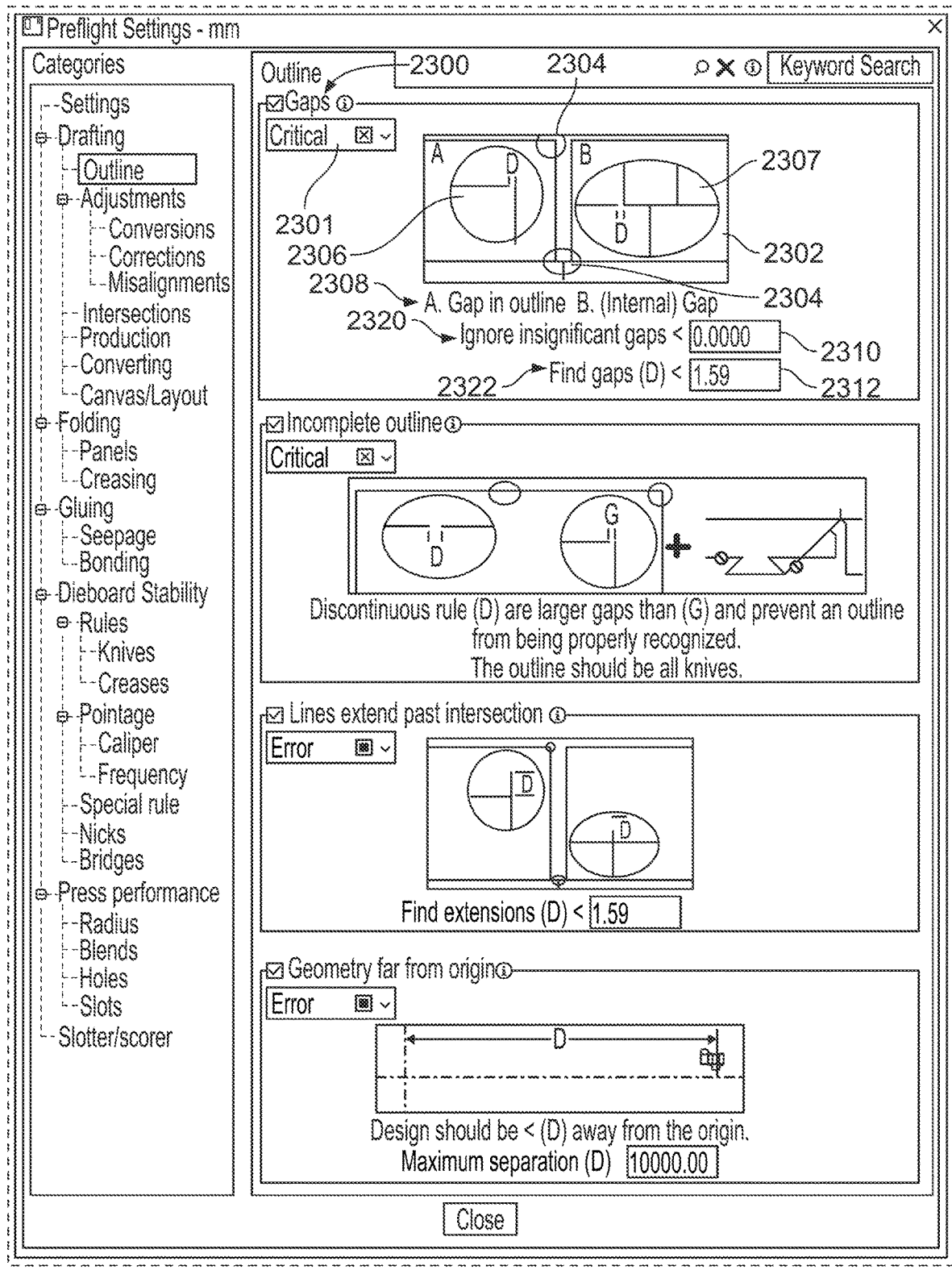
Figure 24:
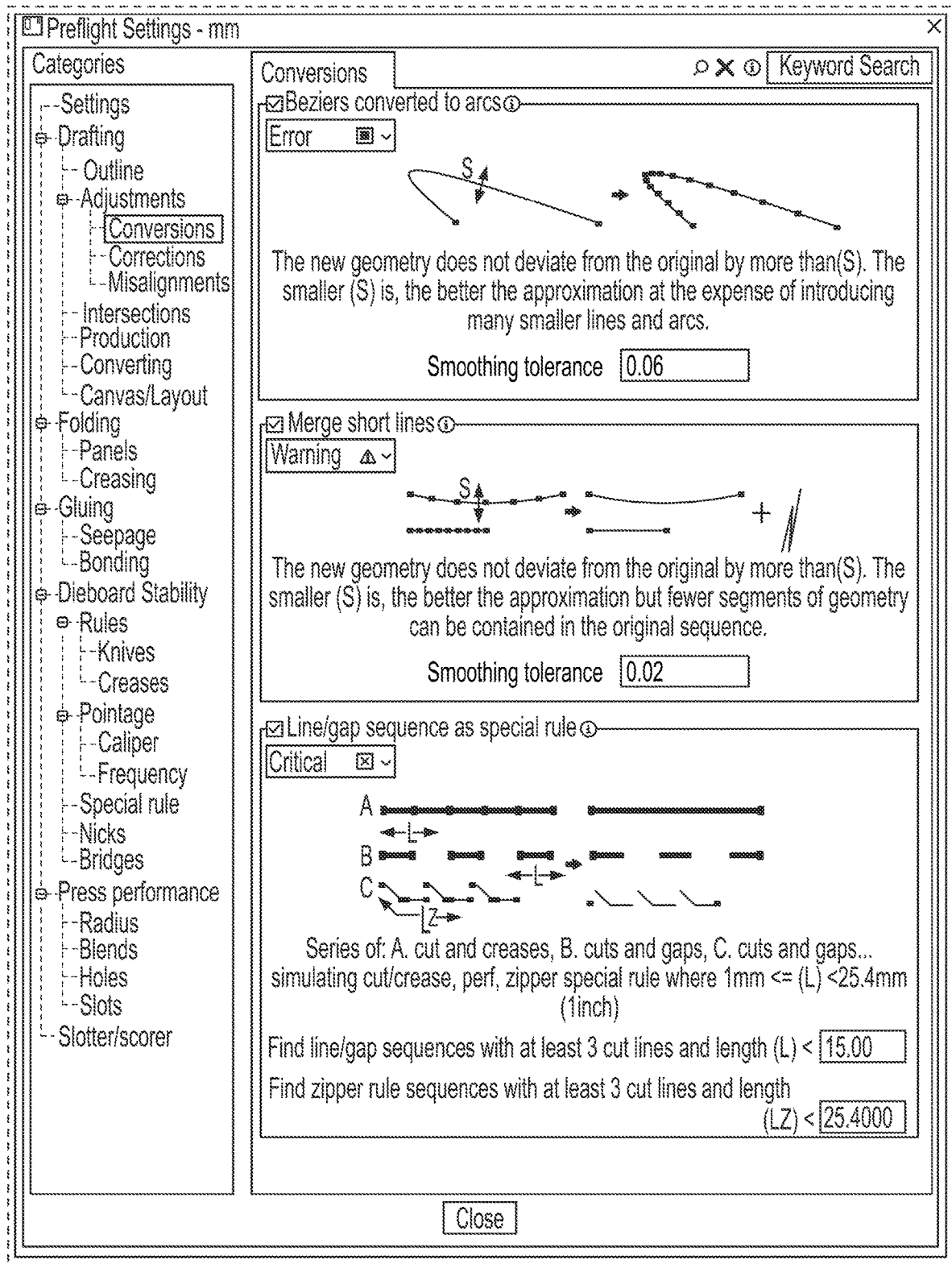
Figure 25:
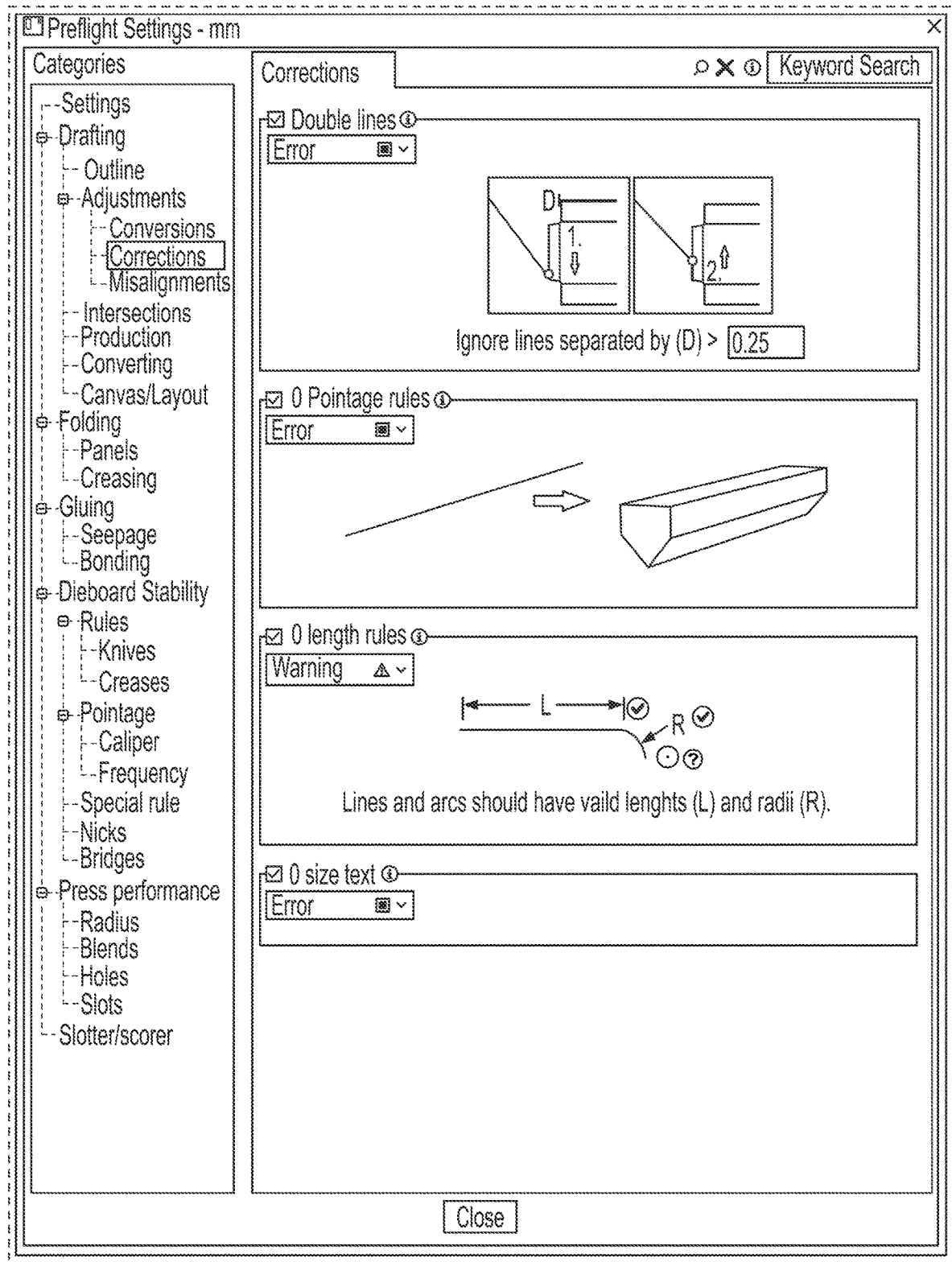
Figure 26:
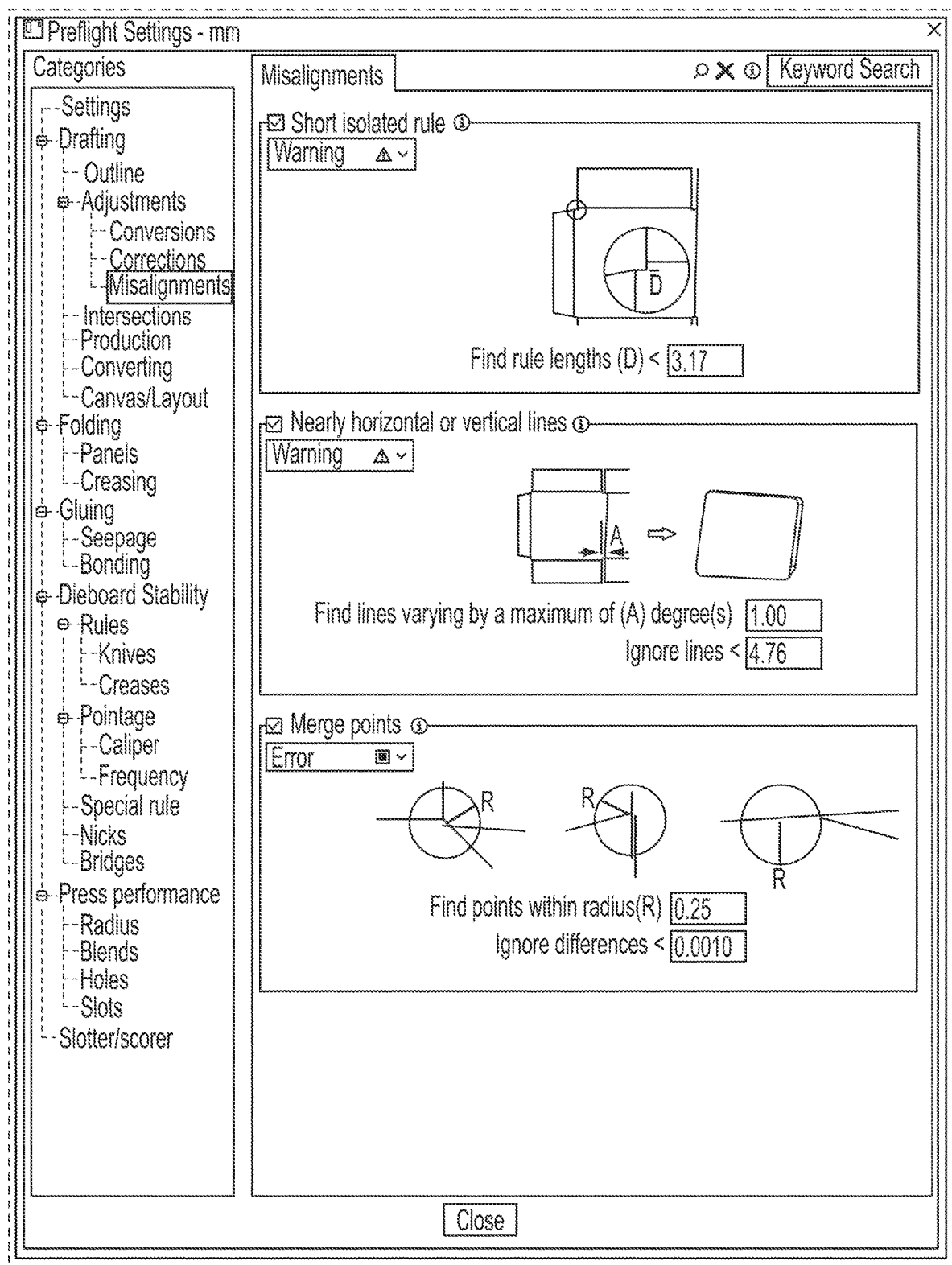
Figure 27:
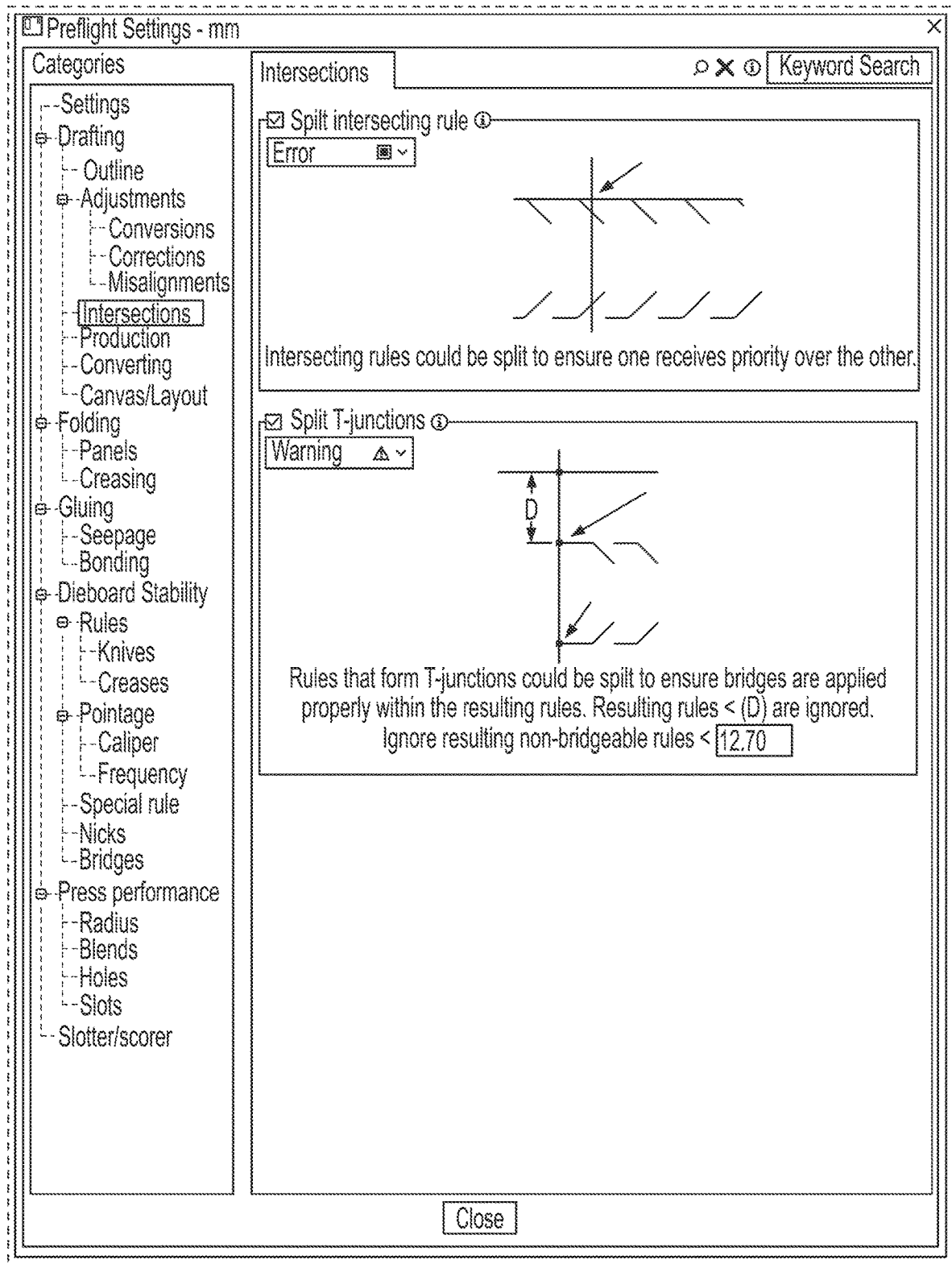
Figure 28:
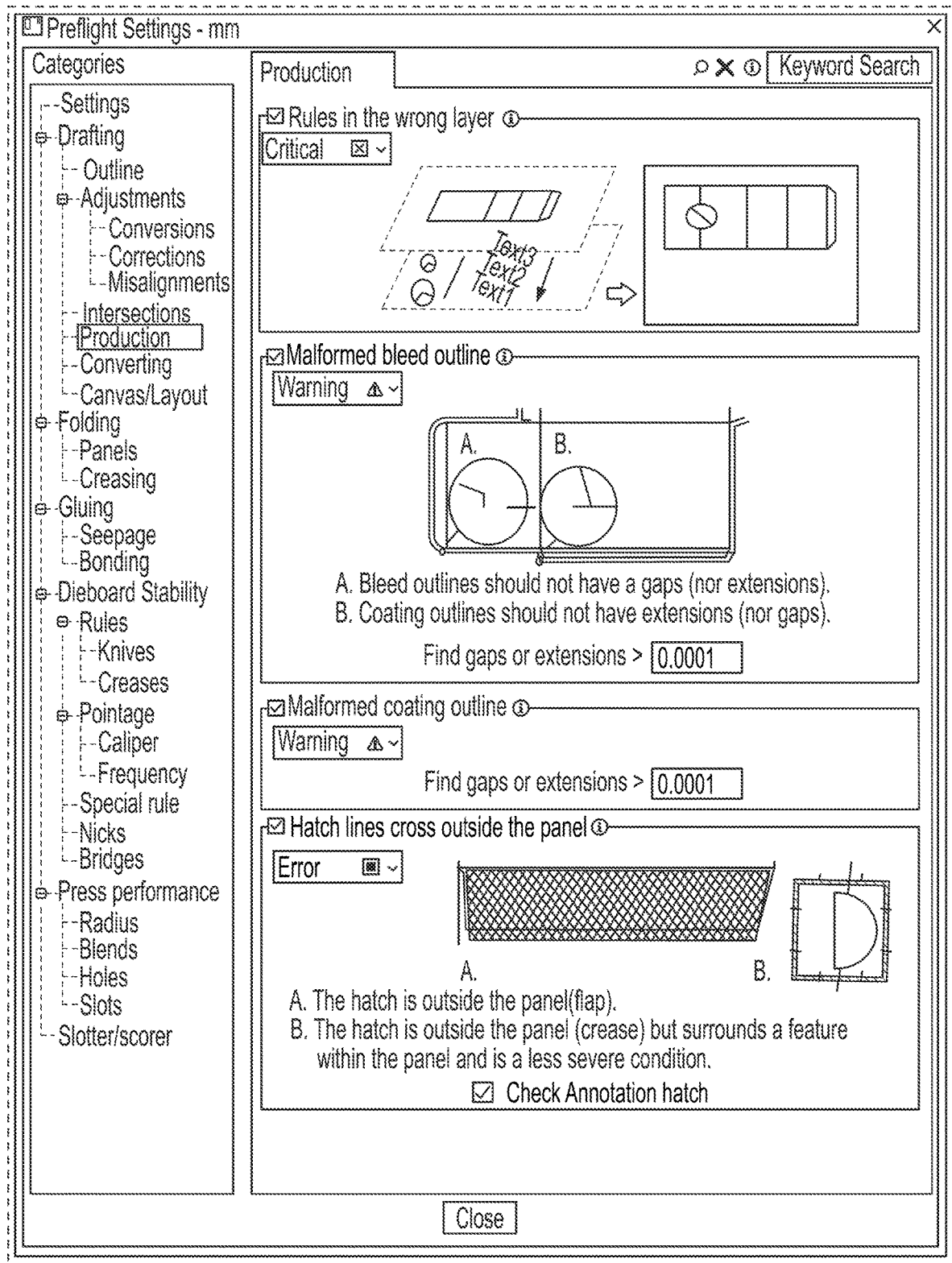
Figure 29:
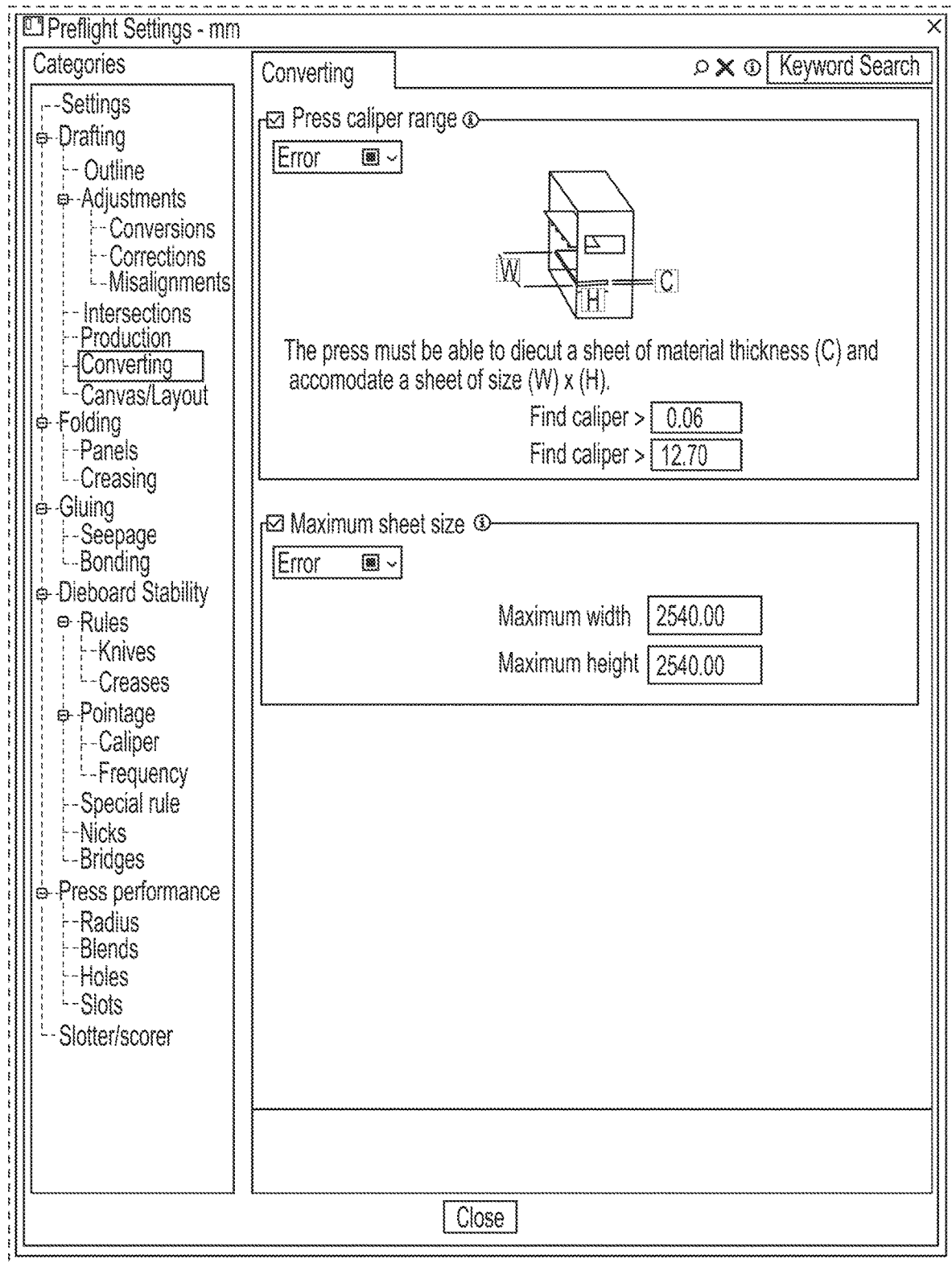
Figure 30:
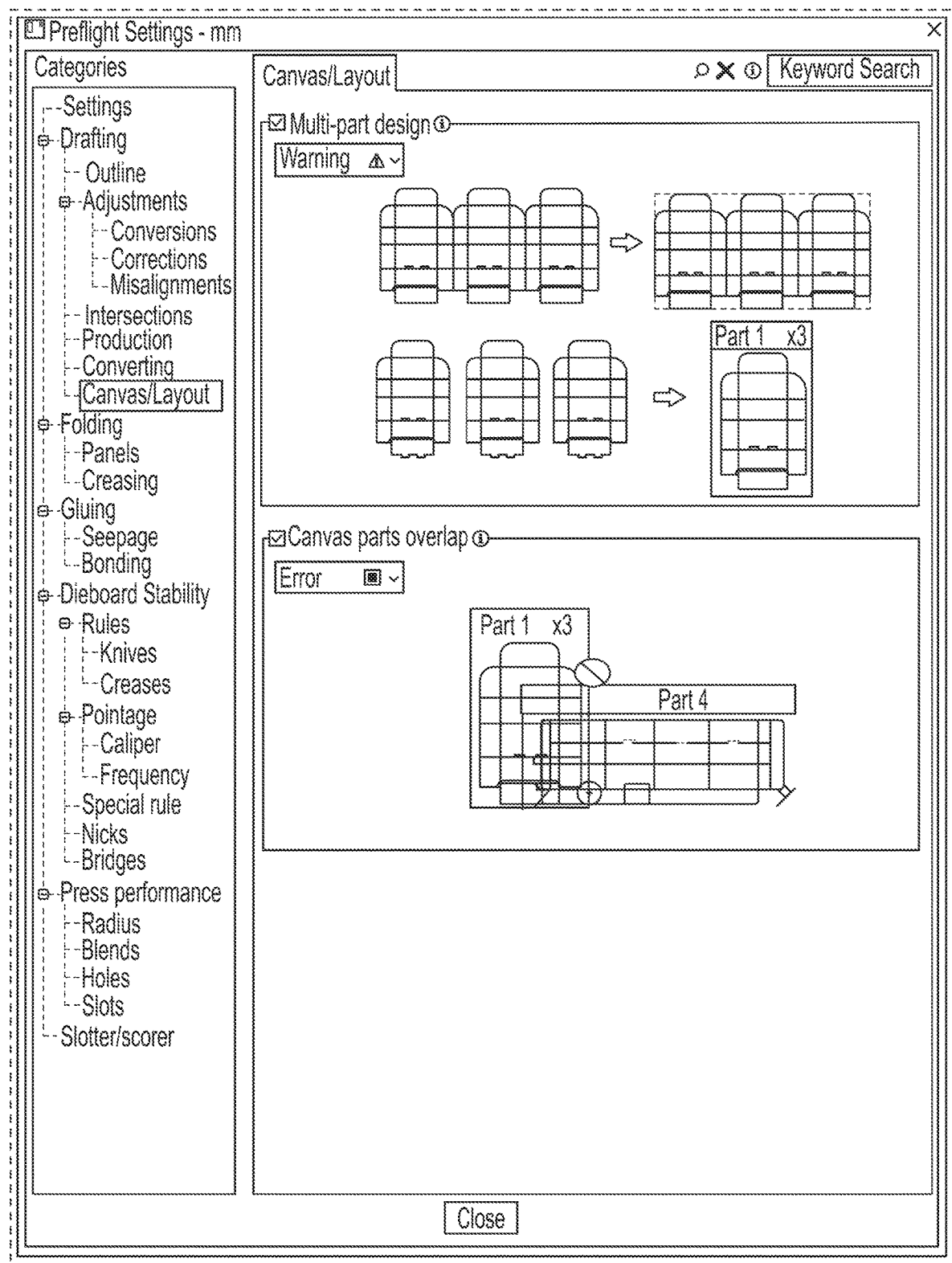
Figure 31:
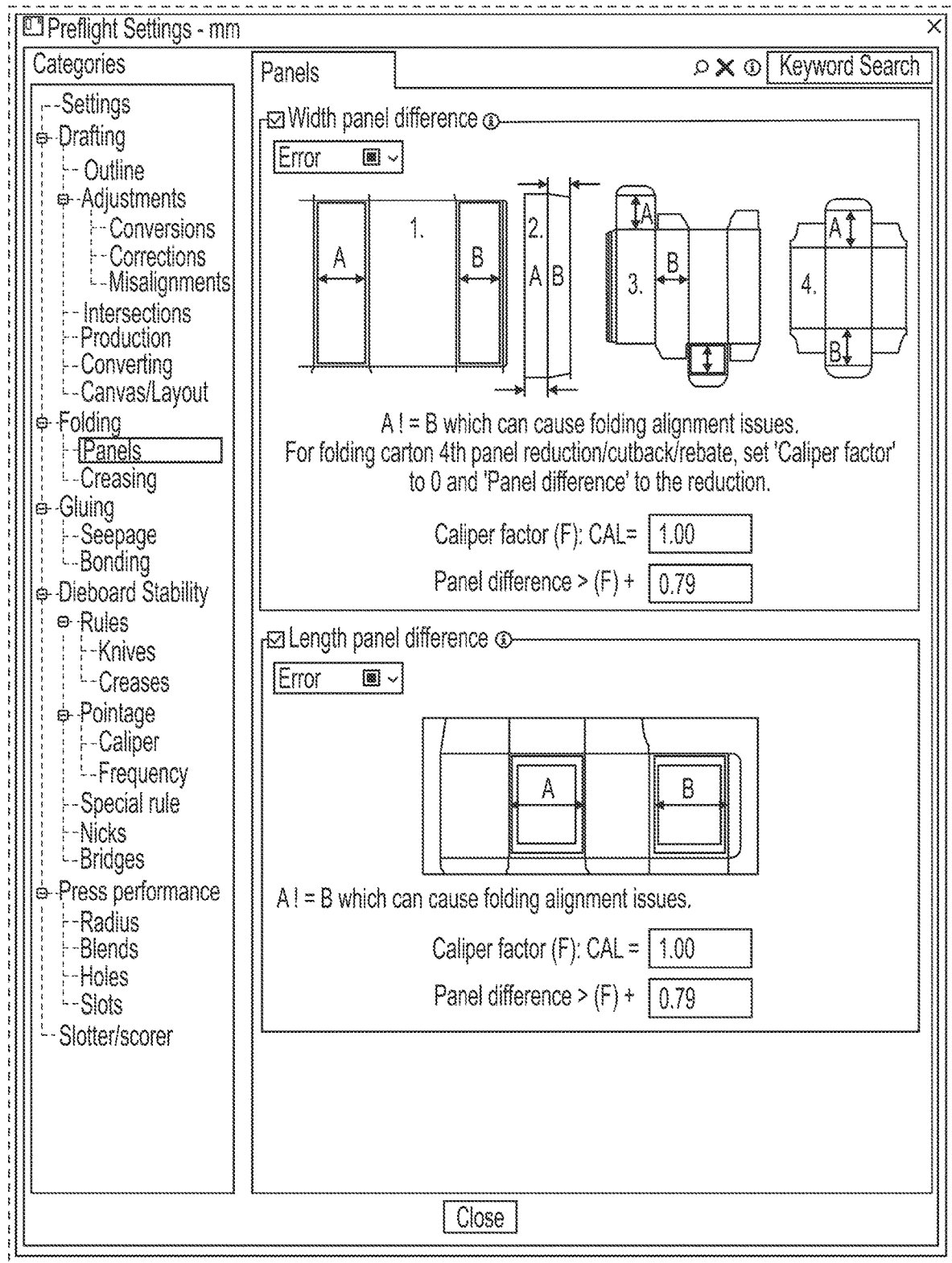
Figure 32:
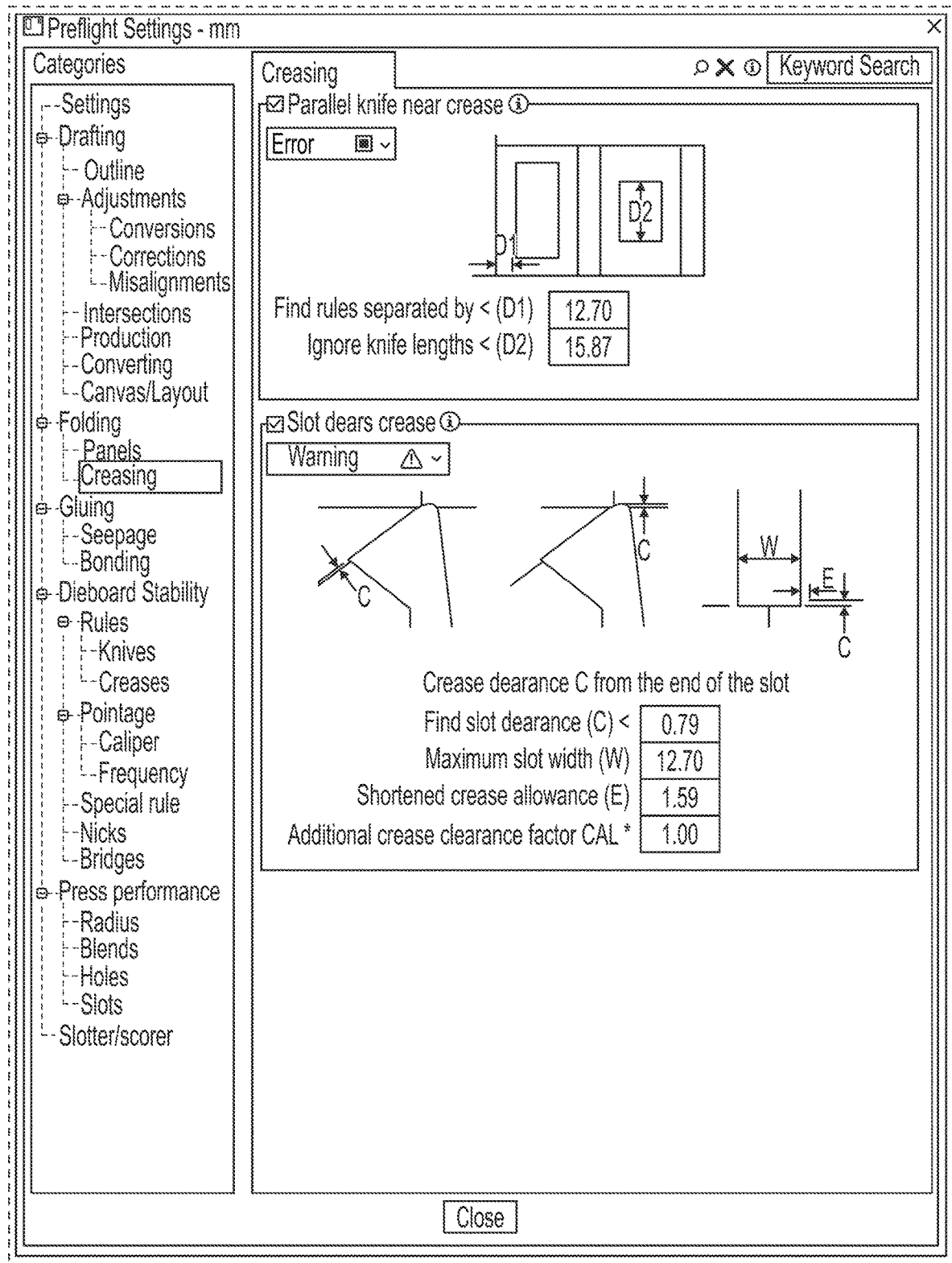
Figure 33:
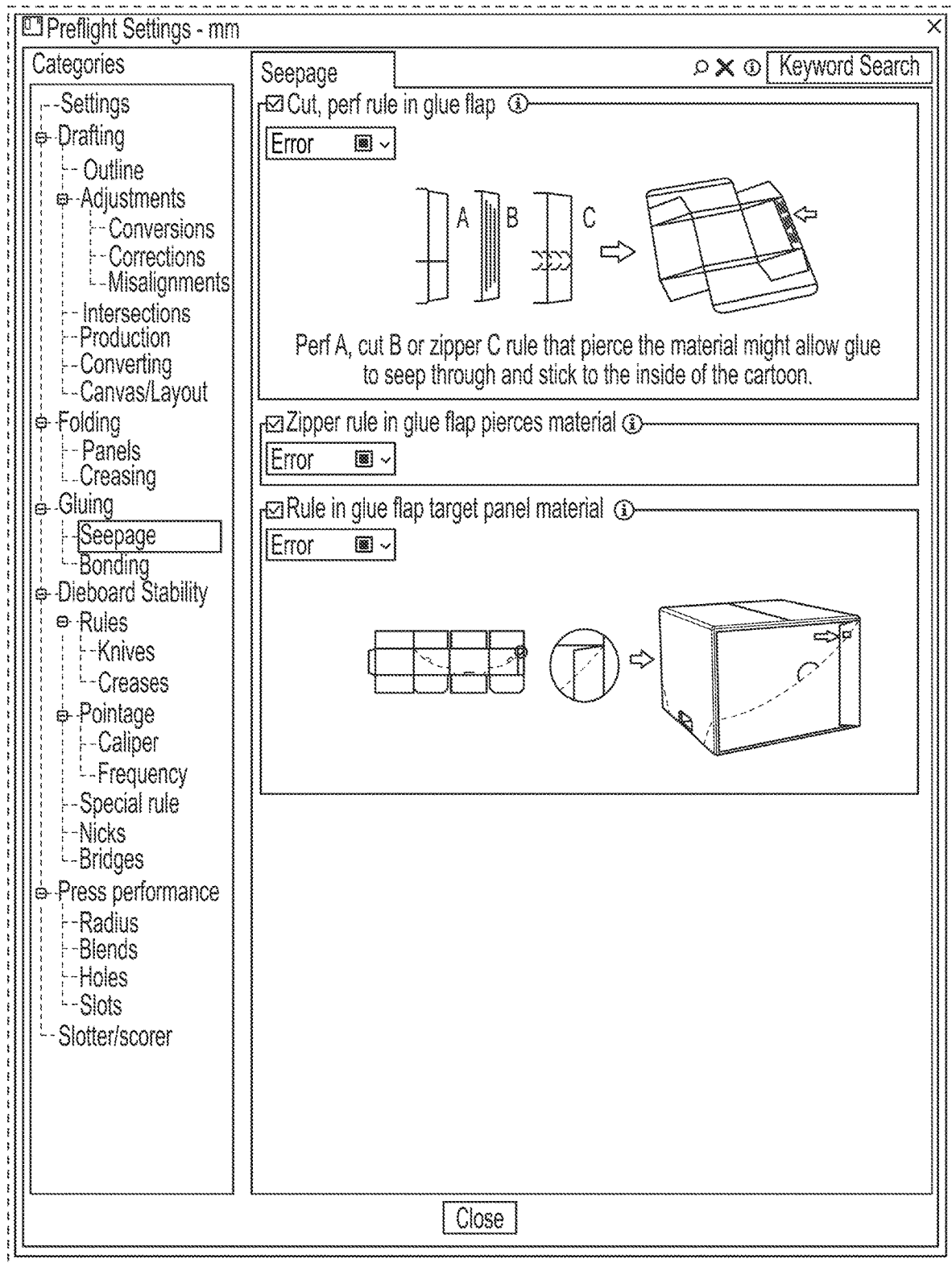
Figure 34:
Figure 35:
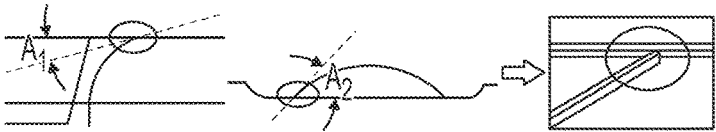
Figure 36:
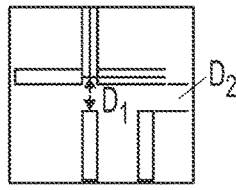
Figure 37:
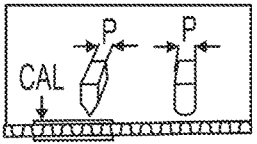
Figure 38:
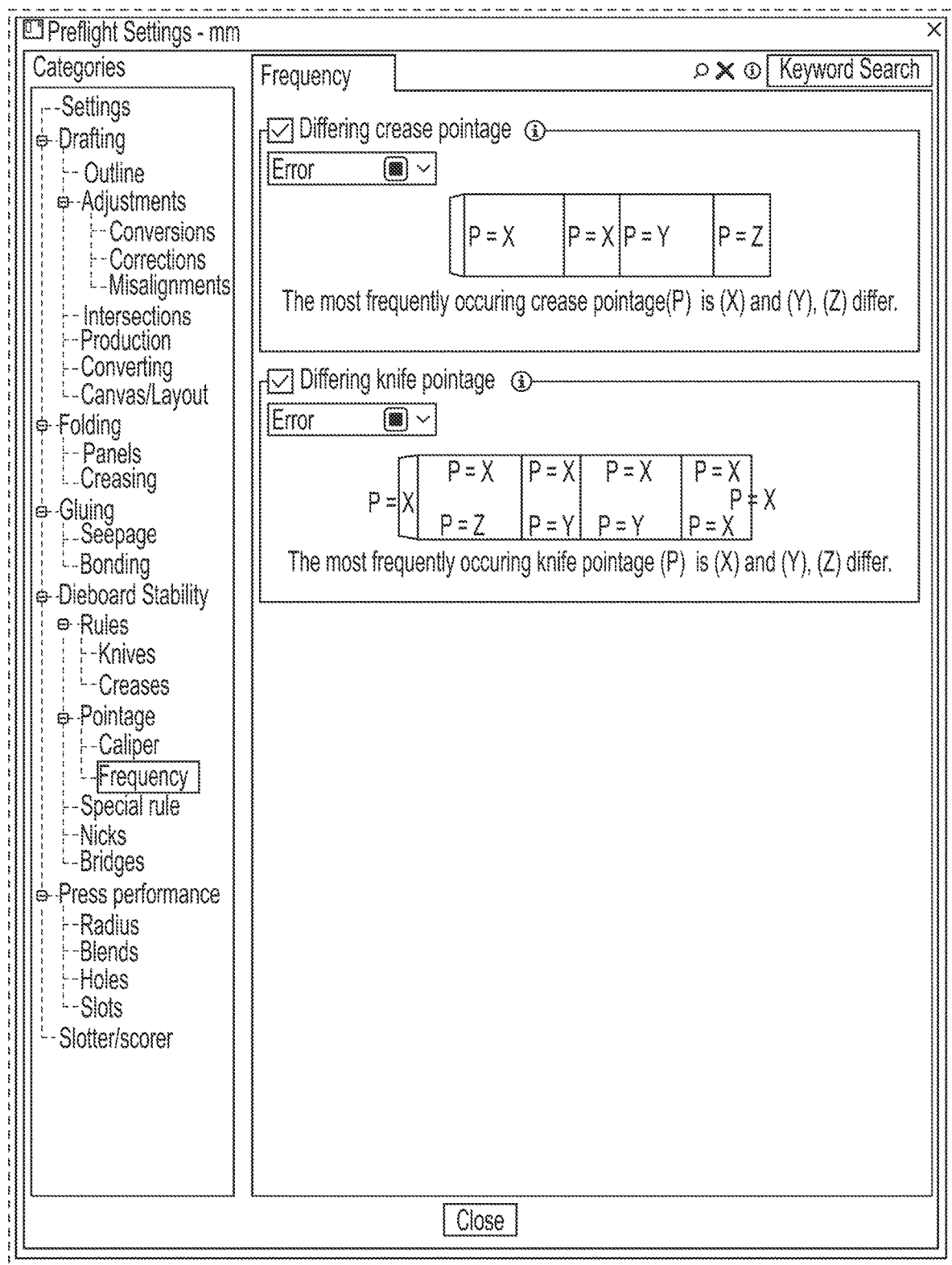
Figure 39:
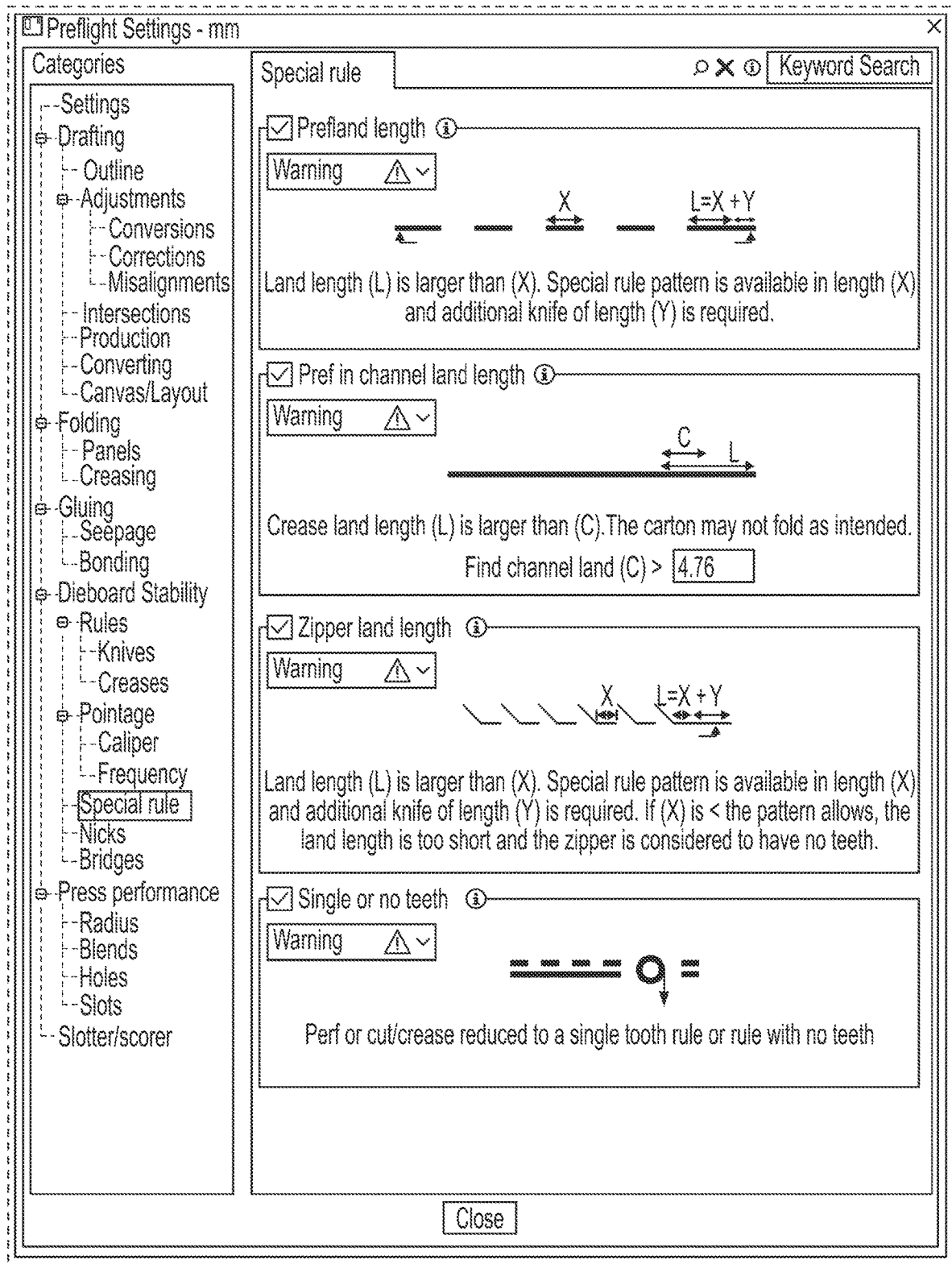
Figure 40:
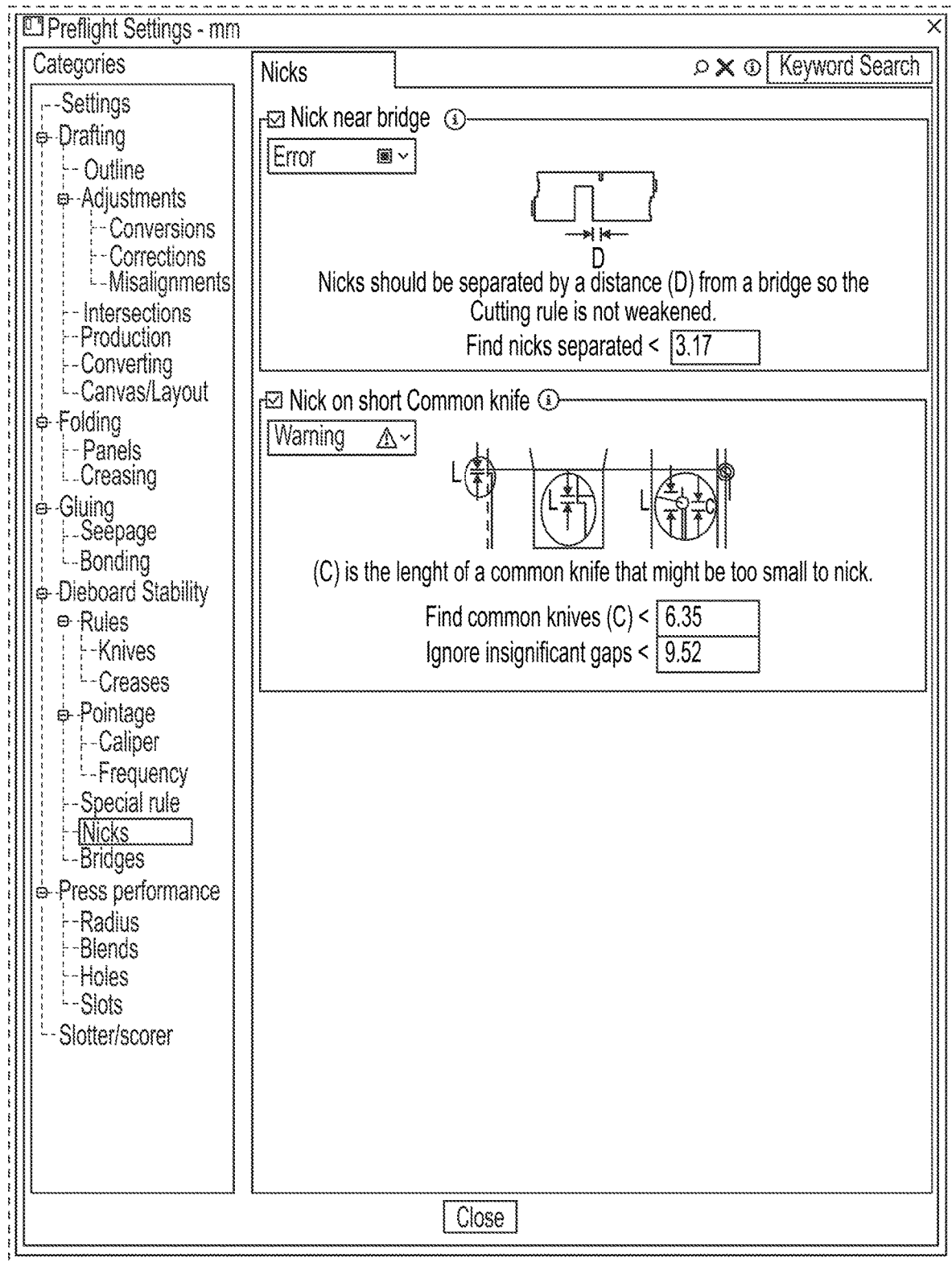
Figure 41:
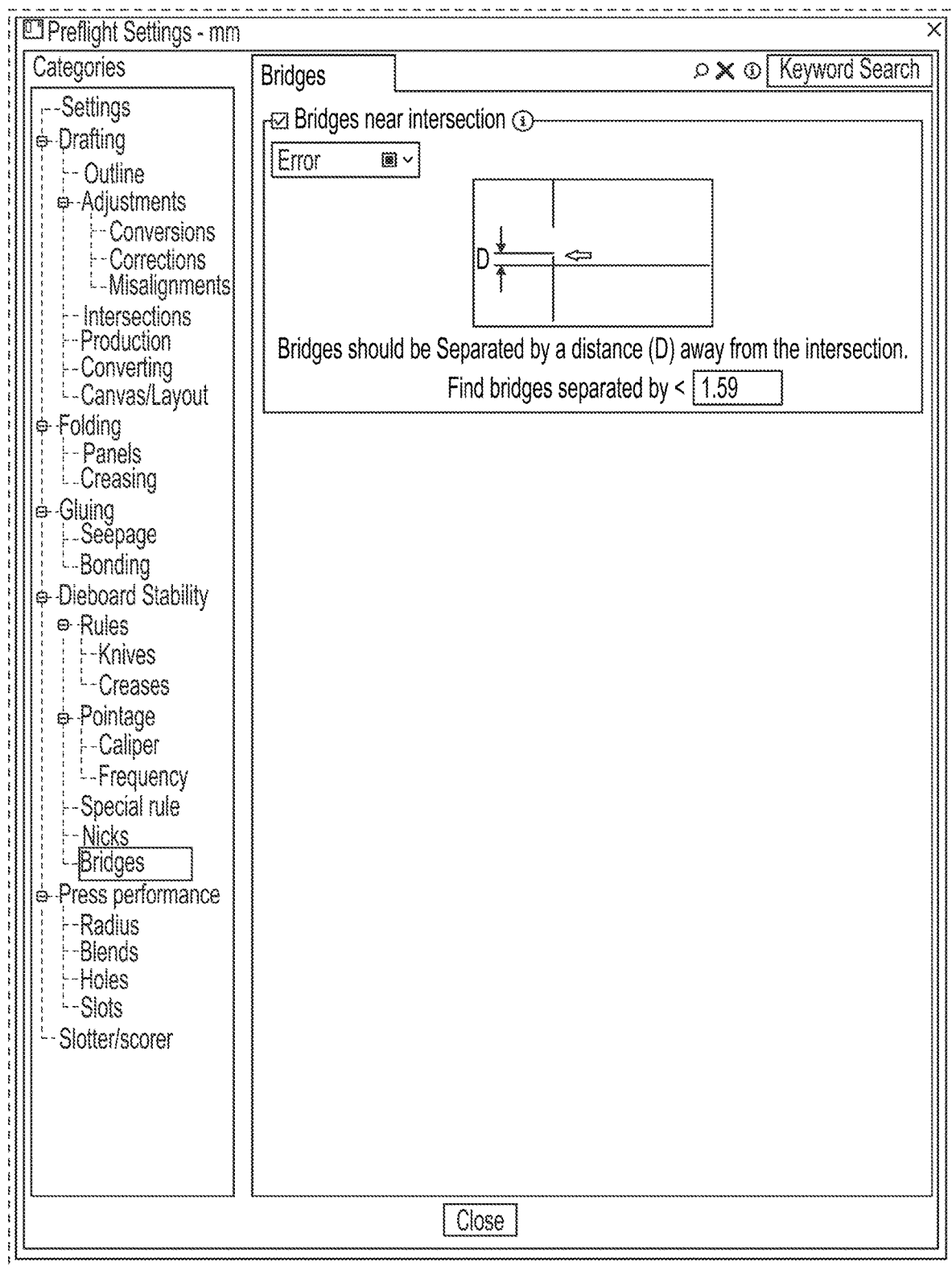
Figure 42:
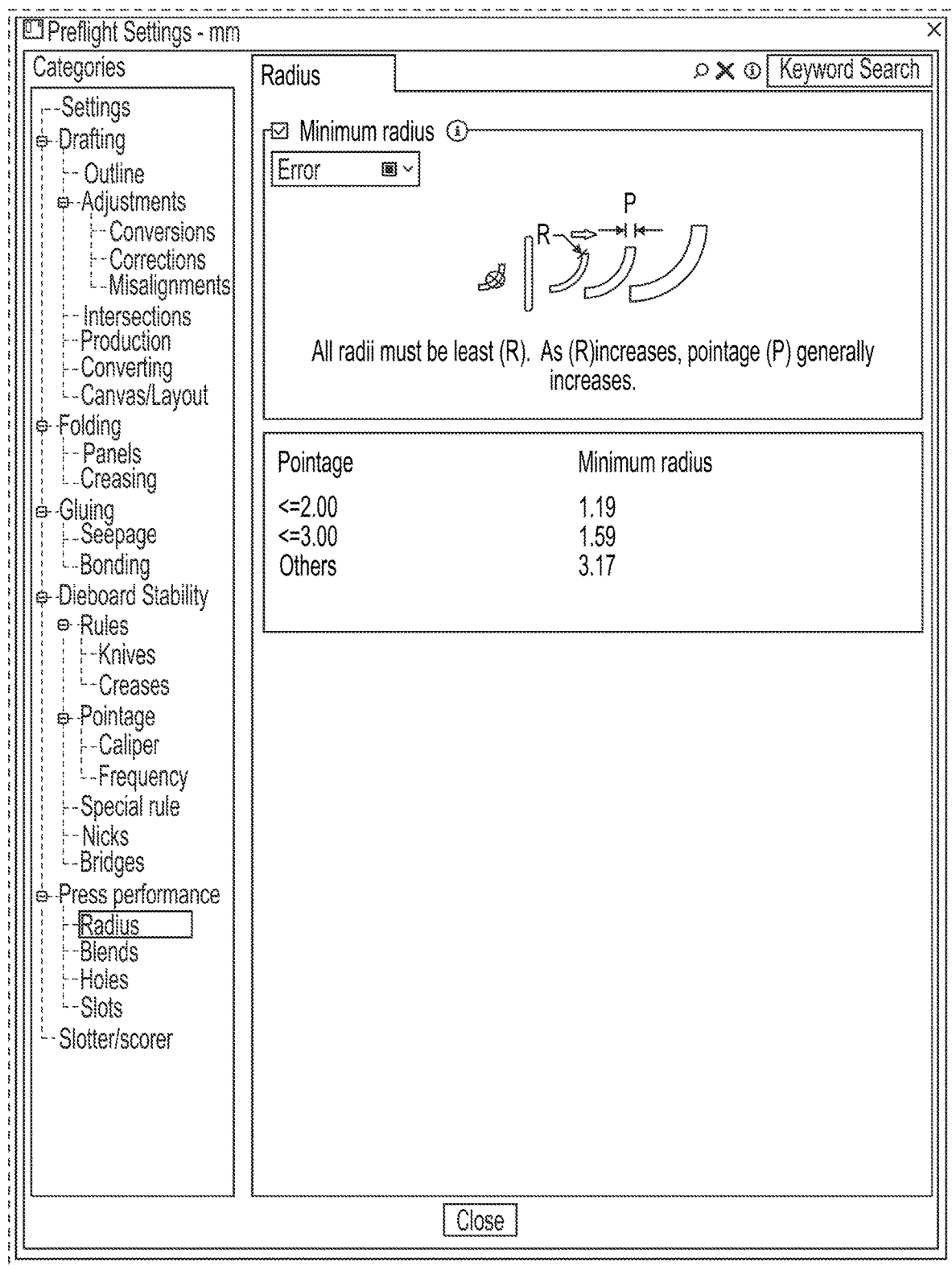
Figure 43:
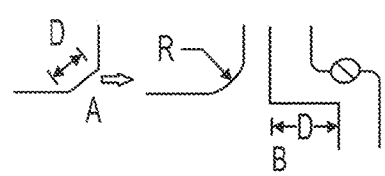
Figure 44:
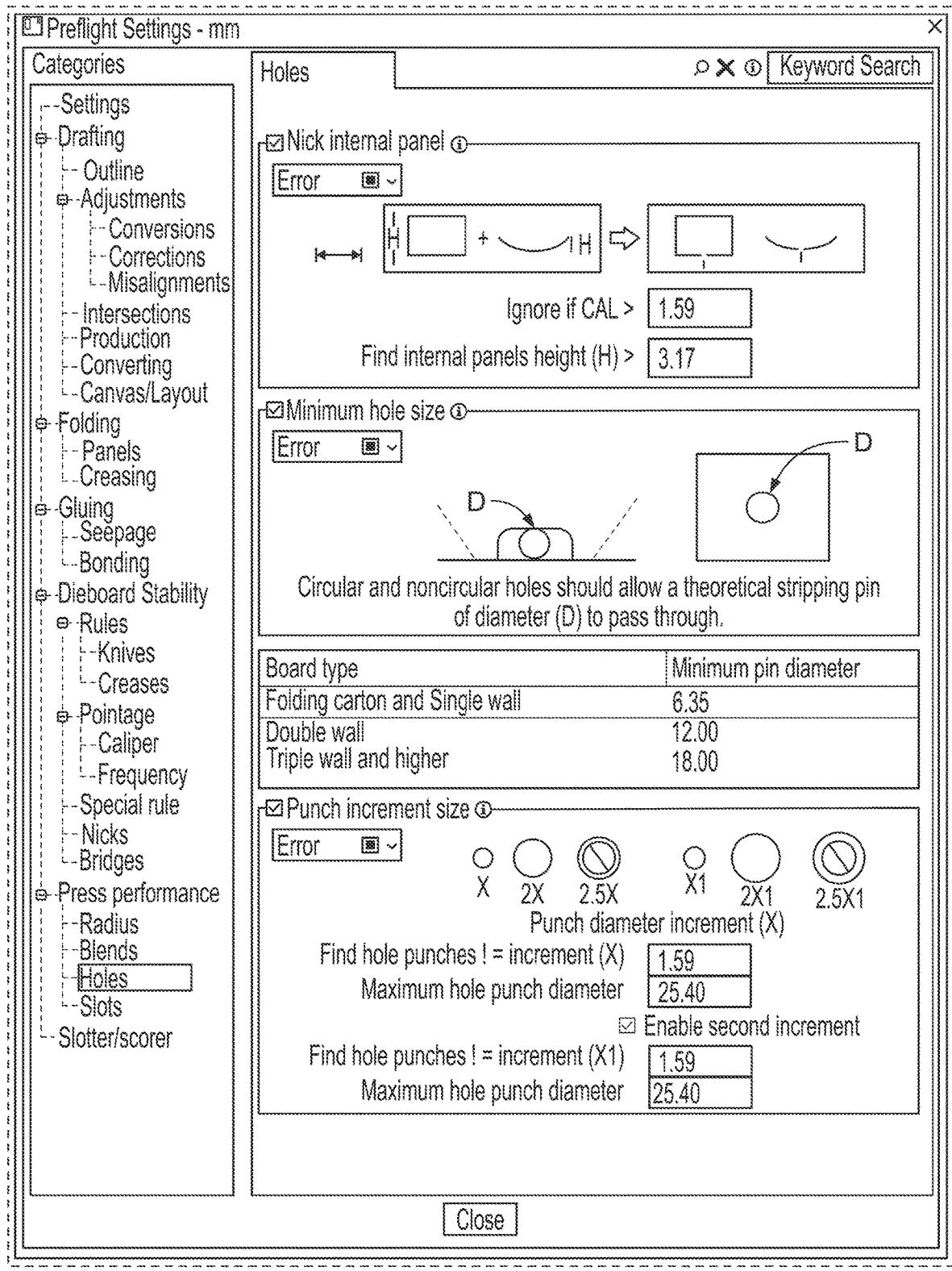
Figure 45:
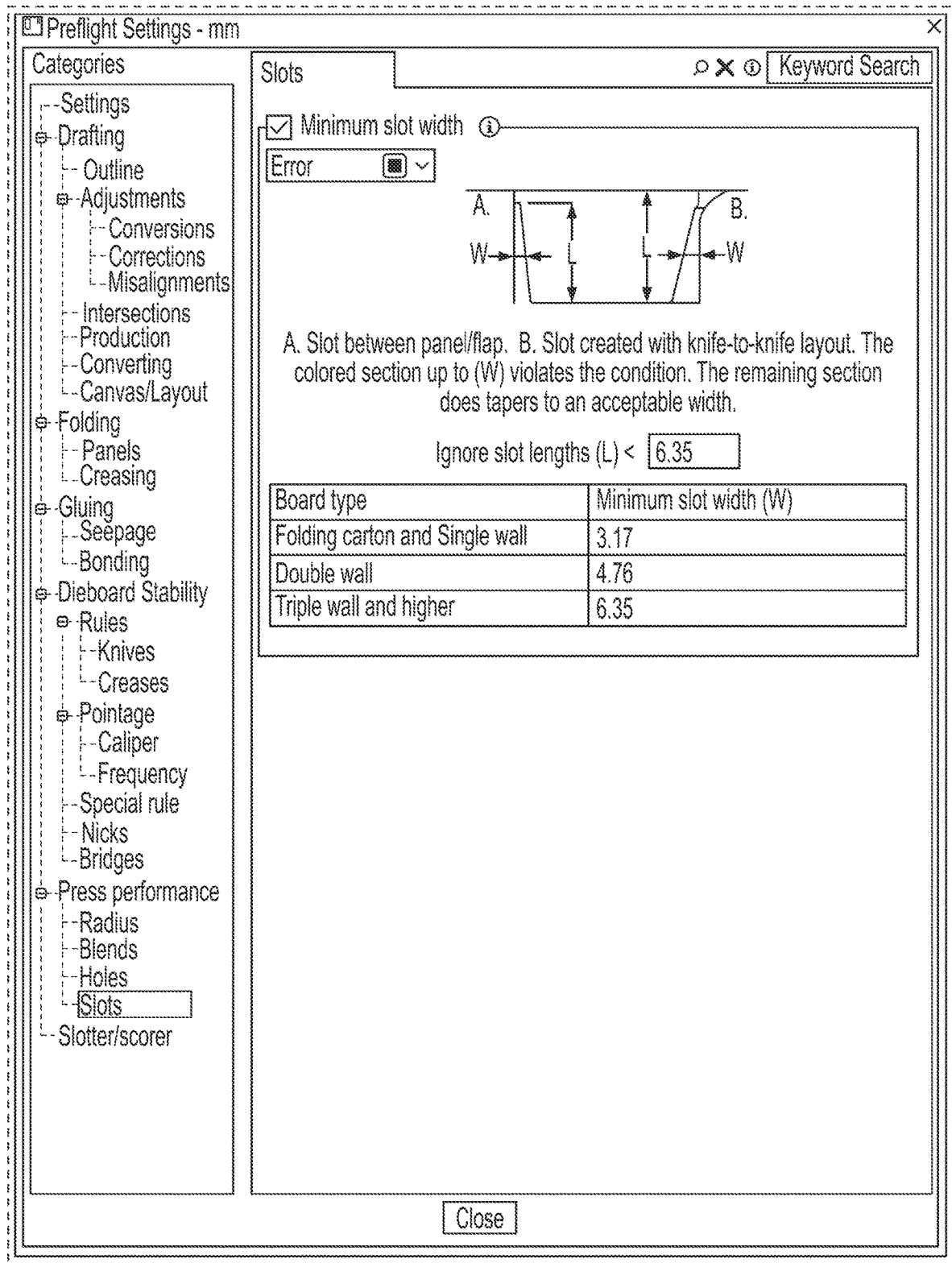
Figure 46:
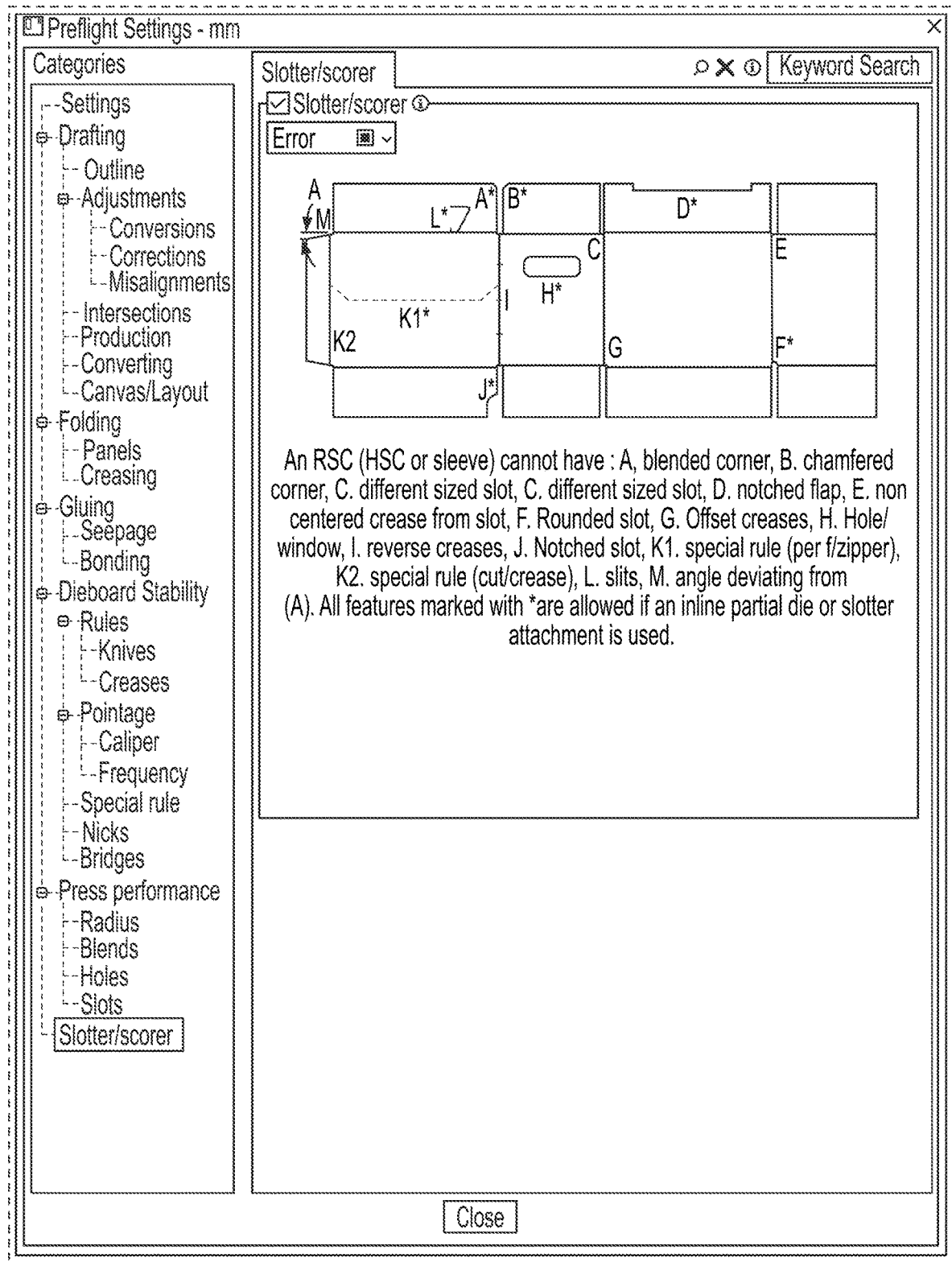

As depicted in FIG. 23, each rule screen may have a general category name shown in the left column (e.g. "Outline") and one or more specific rule names 2300 (e.g. "Gaps") shown in the right column, and may include an interactive field with a dropdown menu 2301 for indicating an importance or priority characterization of a particular rule (e.g. "Critical," "Error," "Warning"). One or more illustrations 2302 may have a first indicator such as a circle 2304 or oval 2305, that indicates an area of interest, and corresponds to a magnified area 2306, 2307, respectively, showing the indicated area in greater detail. Explanatory comments 2308 may correspond to one or more of the illustrations, and one or more parameter entry fields 2310, 2312 may permit user entry of values corresponding to labels 2320, 2322, respectively, for the fields, indicating the parameters corresponding to the rule and illustration to be entered. The illustrations may also employ color-coding (not shown). Various labels (A, B to identify the two different gap illustrations; D to identify the gap in each illustration) may be provided to assist with user understanding.

Exemplary Graphical User Interface Outline Feature

Figure 47A:
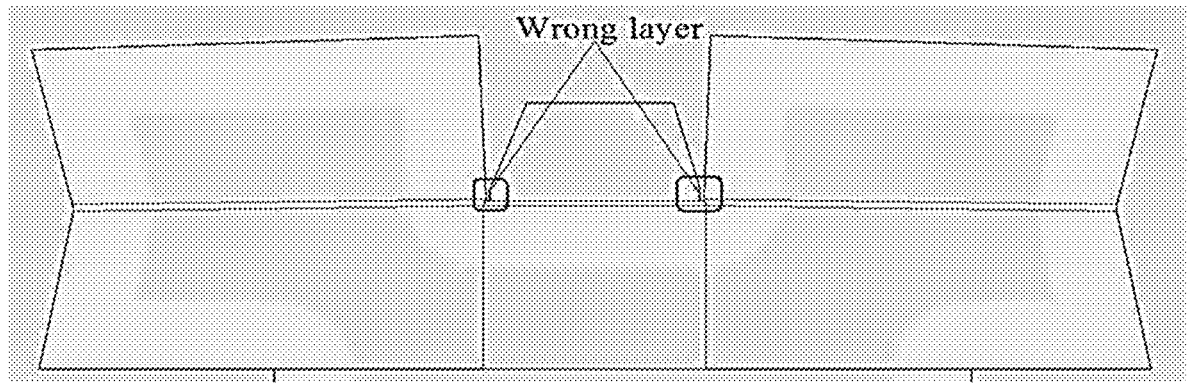
FIG. 47A is an illustration depicting an exemplary outline feature applied to an exemplary design in a graphical portion of an exemplary user interface.
Figure 47B:
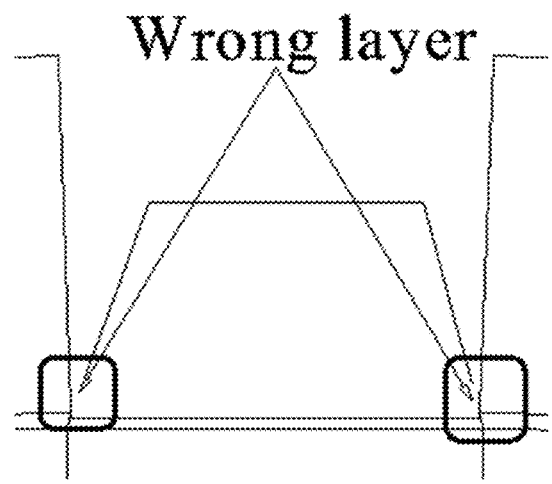
FIG. 47B is an illustration depicting a magnified portion of FIG. 47A.
Figure 47D:
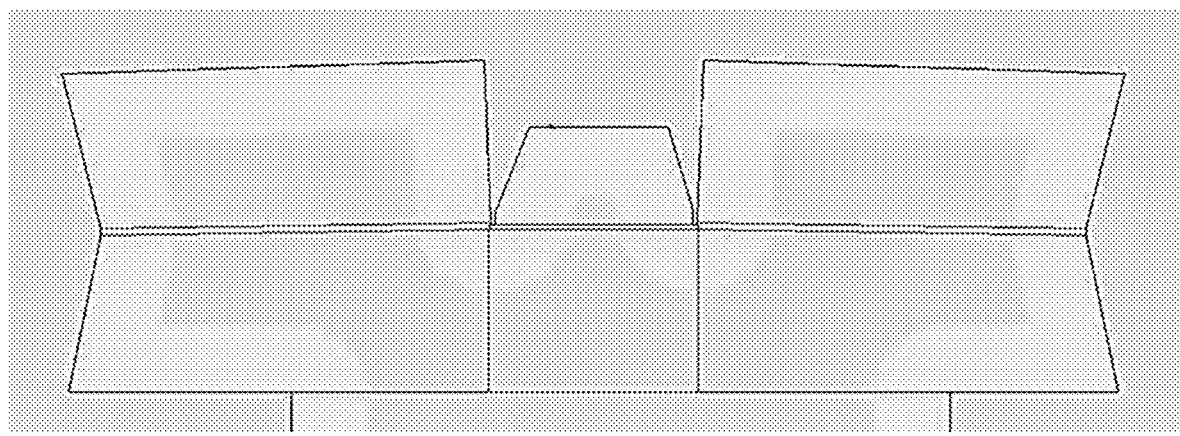
FIG. 47D is an illustration depicting a corrected version of the design depicted in FIG. 47A.
Figure 47C:
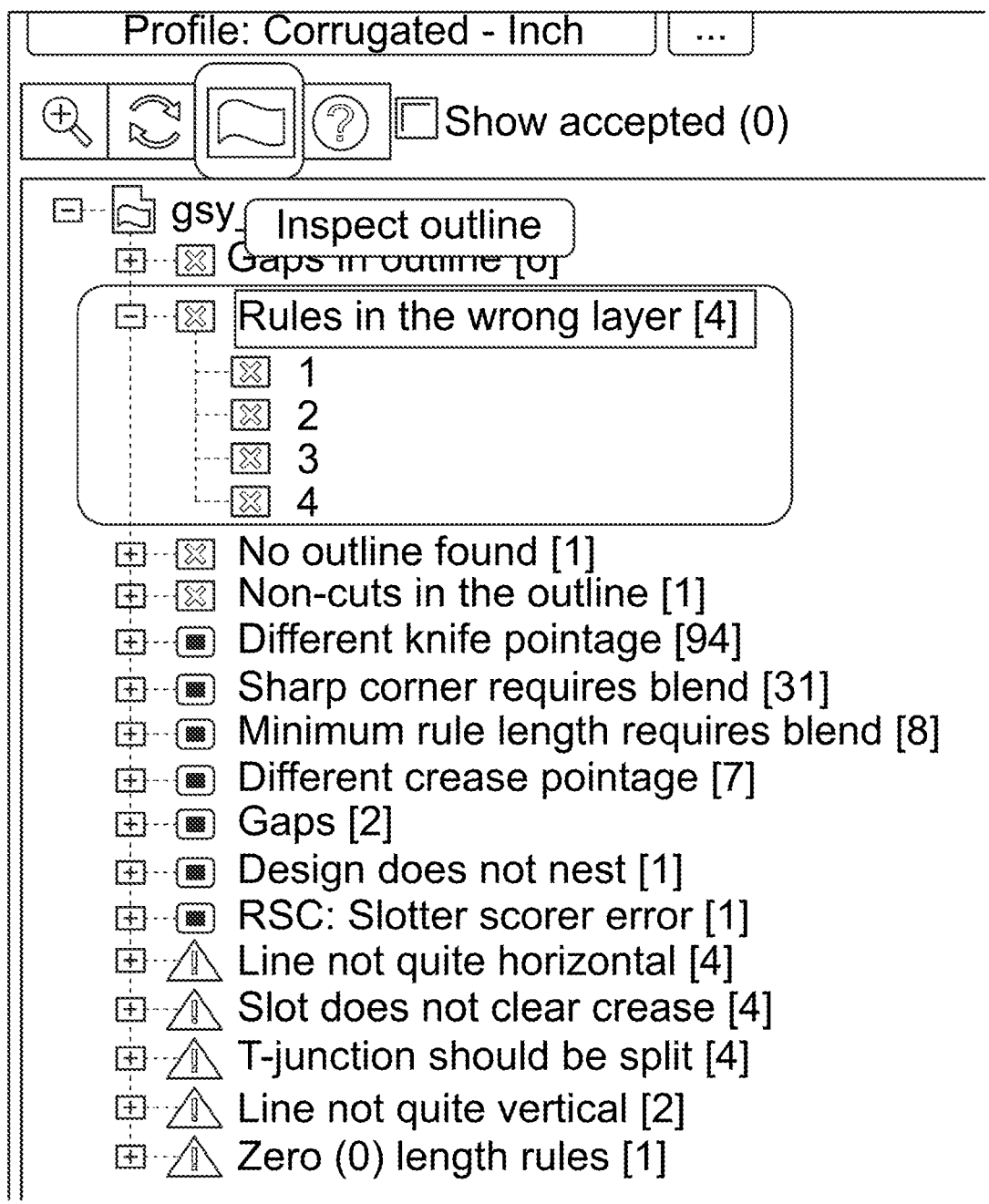
FIG. 47C is an illustration depicting a text portion of the exemplary user interface.

Referring now to FIGS. 47A-D, there is shown in FIG. 47A a portion of an exemplary user interface depicting a portion of CAD design illustration with two small cut lines circled (e.g. in red, in a color interface), with FIG. 47B showing the relevant area in greater magnification, and FIG. 47C showing a related text portion of the user interface. The rule applied in this case is the "Rules in the wrong layer" as shown in the text interface of FIG. 47C, and as applied in the example, is flagging cut lines in the annotation layer. The report to the user may be provided to the user in a more visible manner by the system illustrating the outline that the CAD preflight derives based on the lines as interpreted. As depicted in FIG. 47A, the relatively lighter area corresponds to a shadow in a slightly different shade than the surrounding area. Although depicted in grayscale as a relatively dark background generally with a relatively lighter shade for the outline, in practice, the background may have no color, and the outline may be very light shade of color (e.g. green). While the two cut lines look acceptable when all layers are visible, they cause large enough gaps as to not to result in an outline drawn around the tab, which creates an ambiguity. Showing the outline helps the user better visualize the problem and the result in instances in which gaps in the design may be too ambiguous for the software to be able to follow properly. With the drawing fixed in FIG. 47D, the outline now follows the full contour of the shape, including the flap.

Figure 48A:
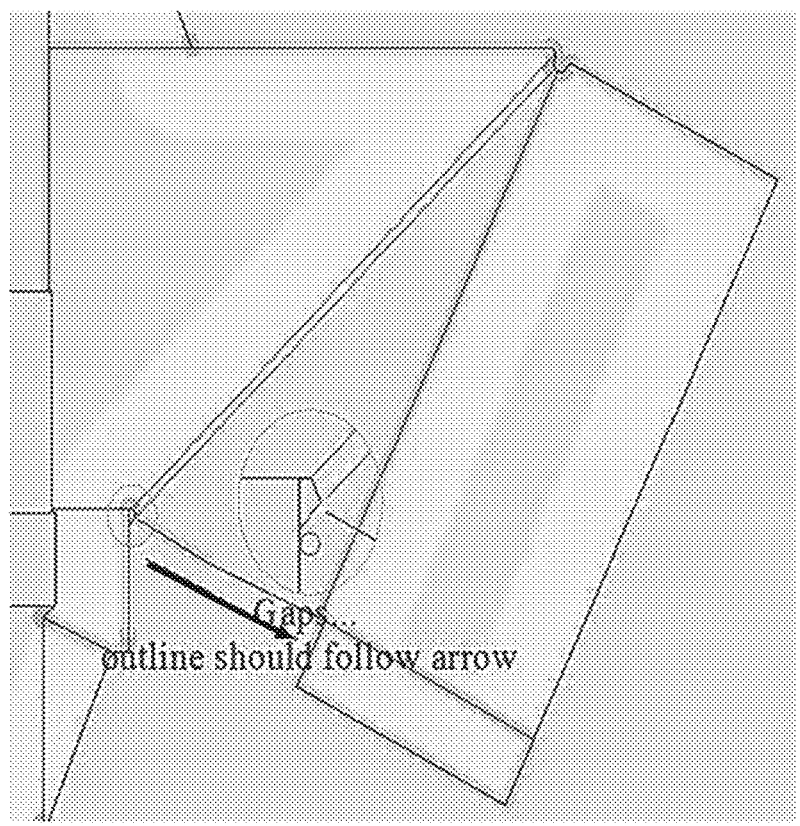
FIG. 48A is an illustration depicting the outline feature as applied to another exemplary design.
Figure 48B:
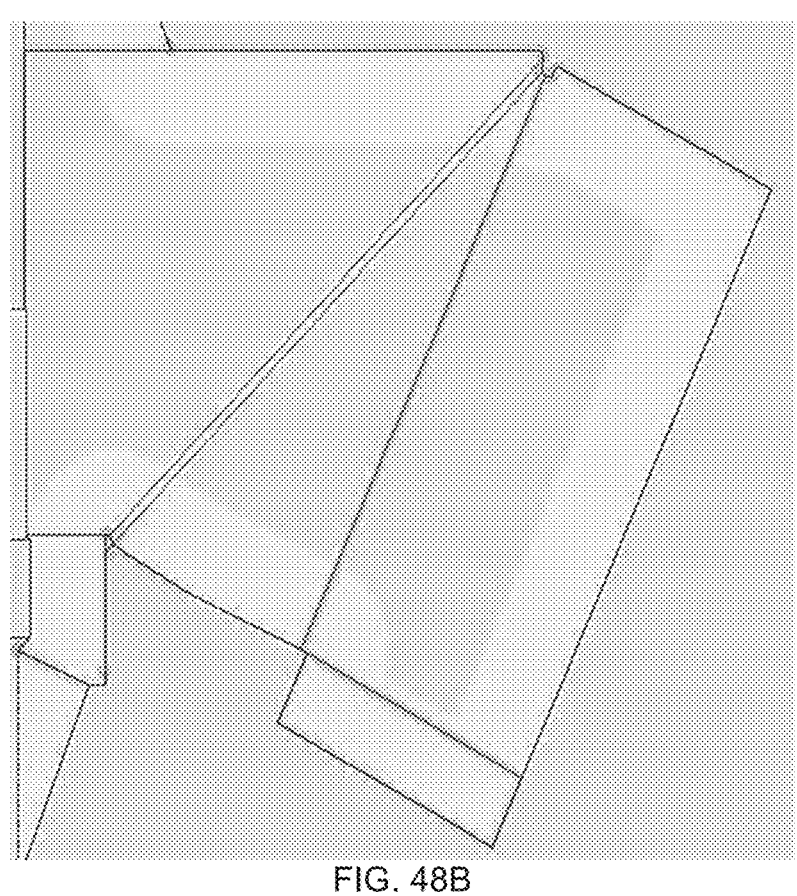
FIG. 48B is an illustration depicting a corrected version of the design depicted in FIG. 48A.

Referring now to FIGS. 48A and 48B, there is shown another example of the outline feature, applied to another design, with a magnified area in the inset ellipse showing the flagged area where gaps are present that result in the outline not following the intended direction. Fixing these gaps results in the proper outline being drawn, as depicted in FIG. 48B.

Accept Option

Figure 49:
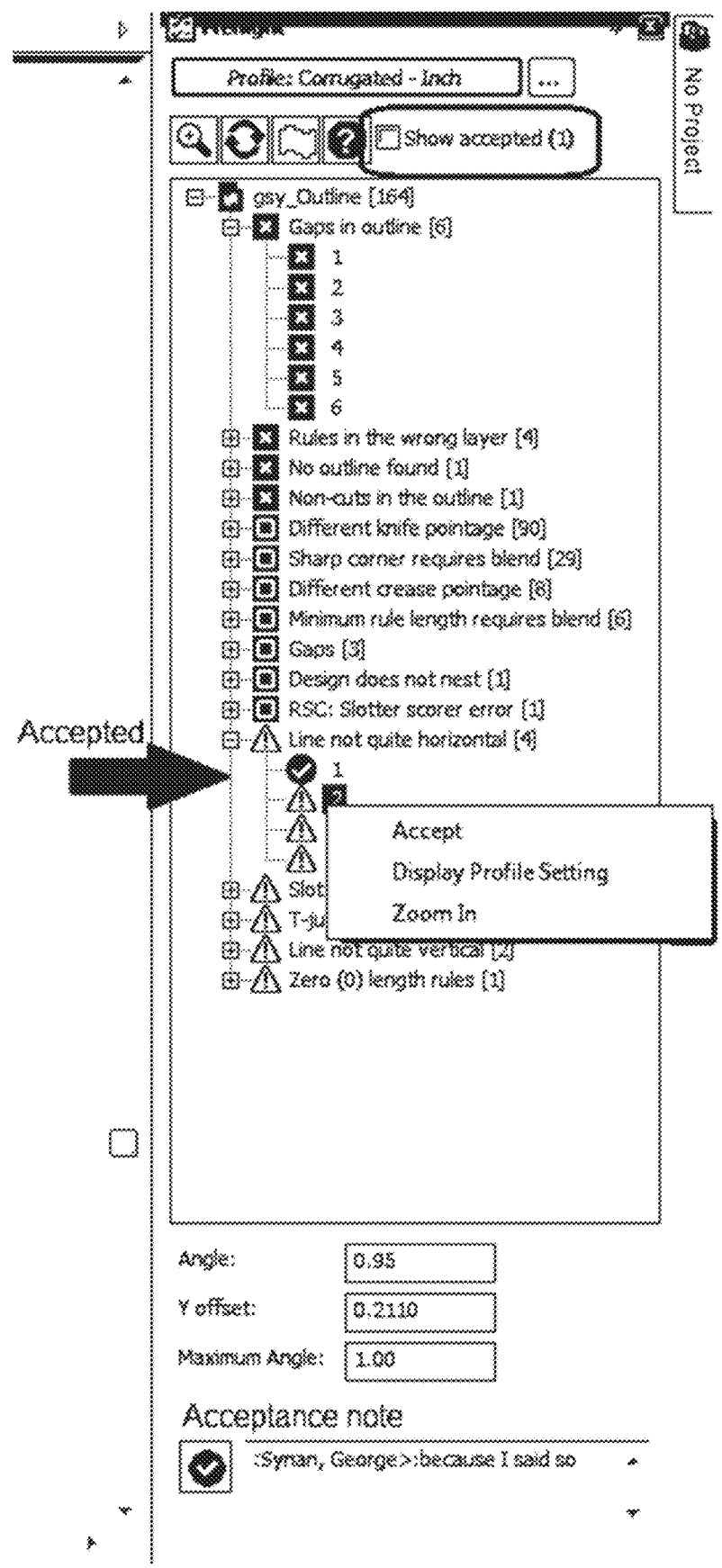
FIG. 49 is an illustration of a portion of an exemplary user interface showing a dialogue for accepting a flagged feature.
Figure 50:
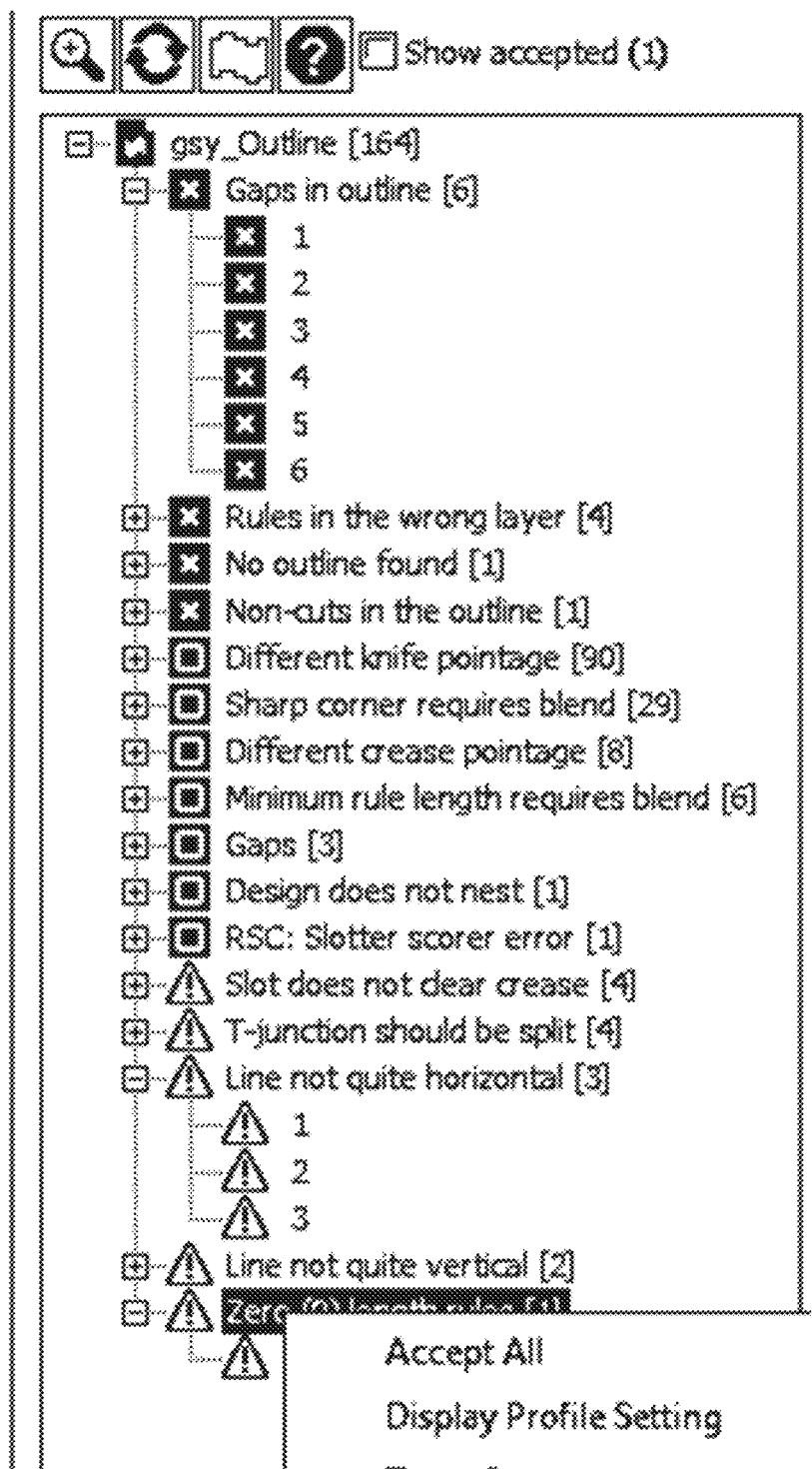
FIG. 50 is an illustration of a portion of an exemplary user interface showing a dialogue for automatically fixing a flagged feature.

Sometimes anomalies are flagged that are exactly as the designer intended and should remain undisturbed, even if a rule is violated. An "accept" instruction, illustrated in the exemplary user interface depicted in FIG. 49, allows the designer to accept the anomaly, and may be provided in the user interface in the form of a dialog box that permits "Accept" to be selected as one of the choices. A check mark (which may be in a green color to differentiate from other icon, such as a red X or a yellow triangle with exclamation point) may signify an accepted anomaly. The user interface may include a feature to "show" accepted anomalies, such as a box that can be checked or unchecked next to the text "Show accepted" and the number of accepted anomalies shown in parenthesis "(1)" adjacent thereto, as shown in FIG. 49. A note can be entered (e.g. in the field below the term "Acceptance note" as depicted in the user interface) giving a reason for the acceptance, which may be a field that can be hidden or unhidden at the user's instruction.

Analytics

Software implementing the rule checking as described herein may also have an option for the user to "opt-in" to allow the information about designs and their preflight status to be recorded (e.g. on a cloud server administered by the software provider). The user (or the software company) can then create reports based on the data stored. Such analytics may give a sense of who/how/how often someone is using the CAD preflight to permit improvements and commercial decision-making.

Quick Fix

For certain anomaly types, a quick fix-it option may be provided from the anomaly list. Such a feature allows an anomaly to be fixed without needing to resort to editing tools or visualization of the anomaly. Such an option may apply only to a relatively discrete set of anomalies, for which the decision to fix is unambiguous. Exemplary anomalies and their quick fixes may include, but are not limited to:

| Anomaly | Quick Fix | Comments |
| --- | --- | --- |
| Double lines | remove | |
| Zero (0) point rules | change to N point | Used in standards to scale geometry to 0 when certain style choices are selected when running standards. These should not be simply deleted |
| Crease, Knife, pointage allowed by caliper | change to N point | user can specify what pointage the anomalies should be |
| Differing crease, Knife pointage | change to N point | user can specify what pointage the anomalies should be |
| zero-size text (and type 99) | conditionally remove | These are used in standards to scale dimensions to 0 when certain panel sequences are selected when running standard and should not be simply deleted. Anomalies inside the bounding box of a design may be presumed style choices and the user may be led not to delete. Anomalies outside the bounding box may be presumed spurious, and the user may be led to delete. |
| zero length lines | conditionally remove | These are used in standards to hide or expand style choices when running standards and should not be simply deleted. Anomalies inside the bounding box of a design may be presumed style choices and the user may be led not to delete. Anomalies outside the bounding box may be presumed spurious, and the user may be led to delete. |
| Merge short lines | Merge into single lines or arcs based on smoothing factor | Short lines to into arcs; short lines into straight line |
| line/gap sequence as special rule | replace with appropriate special rule (cut/crease, perf, zipper) if the starting segment and segment sizes exist in the special rule line type list | If no special rule equivalent exists, then a new one will be created with the translation |
| Convert Beziers to arcs | convert based on smoothing factor | Starting the existing Adjust outline > Convert Bezier to arcs tool is acceptable |

When lines can easily meet at an intersection, the user is preferably permitted to fix it, but if there is a misalignment or ambiguity as to the correct action, the user preferably is not able to fix it. Selection of an "anomaly type" node may prompt a fix it message that permits selection of the option to "fix all," as compared to selection of an individual anomaly that prompts a message just to "fix." Section of one of the gap anomaly types may prompt a "fix if possible" to account for gap anomalies that are ambiguous, whereas selection of an individual gap anomaly that is ambiguous may not prompt the quick fix message at all, thus forcing the user to inspect in more detail. Exemplary anomalies governed by the foregoing may include:

| Anomaly | Quick Fix |
| --- | --- |
| Gaps | extend, if possible |
| Extend past intersection | shorten, if possible |
| Incomplete outline, excluding noncut in outline | extend, if possible |
| Malformed bleed | extend/shorten, if possible |
| Malformed varnish | extend/shorten, if possible |

When ambiguity exists for an anomaly type that could be fixed but cannot be in a particular situation, the node icon may present a visual cue to that effect. For example:

| Anomaly | Normal Quick Fix | Ambiguity |
| --- | --- | --- |
| Rules outside outline | remove if short | Short line can be trimmed, but long line is left intact. Isolated short lines are removed. Rules in wrong layer run "move to layer" tool. |
| Sharp corner requires blend | blend based on radius | Cuts meeting creases shall not be blended. |
| Perf crossing glue flap | split line if necessary and replace partial cut for piece that crosses into flap | No zipper |

Embodiments of the present invention may enable packaging converters to reduce production errors and late-stage rework in their design by identifying potential production improvements early in the design phase. Implementing embodiments of the present invention may reduce unknowns and design changes between the packaging converter and the die vendor, thereby also reducing re-approval cycles and production delays.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for performing a design rule check of a computer aided design (CAD) file, the CAD file defining a geometry of at least one individual periphery to be cut with a cutting tool comprising at least one steel die rule, the cutting tool for use in a packaging-manufacture process for making an article of packaging from a starting material, the method comprising:
   (a) storing in a computer memory one or more design rules in computer code readable by a design rule checking (DRC) module of a computer processor, the one or more design rules comprising a plurality of process operation inefficiency design rules applicable to the CAD file and defined to avoid an inefficient but not inoperable geometry of the cutting tool documented as causing an inefficiency in a non-printing or non-platemaking operation of the process, wherein the plurality of process operation inefficiency design rules include at least one design rule corresponding to an inefficiency in a step for manufacturing the cutting tool, at least one design rule corresponding to an inefficiency in a step of a converting process comprising a cutting step using the cutting tool, and at least one design rule corresponding to an inefficiency in a waste stripping or waste ejection step, a gluing step, or a scoring step downstream of the cutting step, and the inefficient geometry is known to increase processing time in a process operation relative to a more efficient geometry when used in the process;
   (b) processing the CAD file relative to the one or more stored design rules file, the processing comprising using the DRC module;
   (c) identifying a violation of the at least one process inefficiency design rule,
   (d) automatically suggesting at least one design change responsive to the violation of the process inefficiency design rule and automatically providing information regarding an estimated impact on the process corresponding to implementation of the at least one design change, wherein:
      the automatically suggested at least one design change is selected from the group consisting of: eliminating a slot, increasing a slot width, changing a round corner to an angled corner, and replacing a perforation line with a score line, and
      the automatically provided information regarding the estimated impact on the process comprises an estimation of an increase in process throughput;
   (e) receiving a user input responsive to the automatically suggested at least one design change; and
   (f) modifying the CAD file in response to the user input.

2. The method of claim 1, wherein the CAD file defines a layout comprising a plurality of individual peripheries nested on a single sheet.

3. The method of claim 2, wherein the plurality of process operation inefficiency design rules further comprises at least one design rule corresponding to an inefficient geometry of the at least one steel rule die that adversely affects reliability of the at least one steel rule die.

4. The method of claim 1, wherein the information regarding the estimated impact includes a link to an audiovisual file illustrating the impact in audiovisual form.

5. The method of claim 1, wherein the information regarding the estimated impact includes an estimate of a production efficiency differential associated with implementing or not implementing the suggested design change.

6. The method of claim 5, wherein the estimate of production efficiency differential is expressed in units produced per unit time.

7. The method of claim 1, further comprising cutting a sheet of the starting material using the tool, thereby creating a cut shape for further processing into the article and at least one section of waste.

8. The method of claim 7, further comprising ejecting the at least one section of waste from the cut shape.

9. The method of claim 8, further comprising (a) scoring at least one portion of the cut shape to create a scored shape without fully perforating the cut shape, (b) folding the cut shape and gluing at least one portion of the cut shape to another portion of the cut shape, or a combination of (a) and (b).

10. The method of claim 9, further comprising forming the article of packaging from the cut shape after scoring, folding, and/or gluing.

11. The method of claim 1, wherein the CAD file defines a two-dimensional (2D) design.

12. The method of claim 11, wherein the article has a 3-dimensional geometry configured to be formed entirely from a single instance of the cut shape having the 2-dimensional design.

13. The method of claim 1, wherein the CAD file is stored in memory as set of geometric vectors that define a plurality of lines, and the DRC module evaluates the CAD file relative to the one or more design rules using an algorithm that iteratively follows each line in the plurality of lines and evaluates all other lines relative to the followed line for geometric relationships indicative of a process inefficiency design rule violation.

14. The method of claim 13, wherein the algorithm that iteratively follows each line in the plurality of lines and evaluates all other lines relative to the followed line is configured to first evaluate a relationship between each line being followed and all other lines, and to exclude from further consideration any other lines that are more than a threshold distance from the line being followed.

15. The method of claim 1, further comprising providing a graphical user interface including a display, wherein the step of identifying the violation includes displaying on the display a graphical view of a portion of the CAD design with a highlighted area showing an outline of a shape to be cut corresponding to the violation as interpreted by the DRC module based upon the design, and displaying an illustration of the suggested design change.

16. The method of claim 1, wherein the step of receiving a user input responsive to the suggested design change includes receiving an input accepting an identified anomaly despite the identified violation.

17. The method of claim 1, wherein the CAD file further defines at least one feature within the individual periphery, the at least one feature selected from the group consisting of: a window, a score, a slit, a crease, a nick, and one or more perforations.

18. The method of claim 1, wherein the plurality of process operation inefficiency design rules includes:
   at least one design rule relating to spacing between the at least one steel rule die and an adjacent another steel rule die;
   at least one design rule relating to an end location of the at least one steel rule die; and
   at least one design result relating to an intersection between the at least one steel rule die and an intersecting another steel rule die.

19. The method of claim 18, wherein the at least one design rule corresponding to an inefficiency in a waste stripping or waste ejection step comprises the at least one design rule relating to the end location of the at least one steel rule die, and includes a requirement for the end location to be within a straight run.

20. The method of claim 18, wherein the at least one design rule corresponding to an inefficiency in a waste stripping or waste ejection step includes comprises the at least one design rule relating to the intersection between steel rule dies, and includes a requirement that the steel rule die be manufactured having a round corner at which two lines fully intersect.

21. An article of manufacture comprising non-transitory computer readable media programmed with computer program code readable by a computer, the code comprising instructions for performance of a design rule check of a computer aided design (CAD) file by a computer processor, the CAD file defining a geometry of at least one individual periphery to be cut with a cutting tool comprising at least one steel die rule, the cutting tool for use in a packaging-manufacture process for making an article of packaging from a starting material, including:
(a) instructions for causing the computer processor to store in a computer memory one or more design rules in computer code readable by a design rule checking (DRC) module of the computer processor, the one or more design rules comprising a plurality of process operation inefficiency design rules applicable to the CAD file and defined to avoid an inefficient but not inoperable geometry of the cutting tool documented as causing an inefficiency in a non-printing or non-platemaking operation of the process, wherein the plurality of process operation inefficiency design rules include at least one design rule corresponding to an inefficiency in a step for manufacturing the cutting tool, at least one design rule corresponding to an inefficiency in a step of a converting process comprising a cutting step using the cutting tool, and at least one design rule corresponding to an inefficiency in a waste stripping or waste ejection step, a gluing step, or a scoring step downstream of the cutting step, and the inefficient geometry is known to increase processing time in a process operation relative to a more efficient geometry when used in the process;
(b) instructions for causing the DRC module to process the CAD file relative to the one or more stored design rules file;
(c) instructions for causing the DRC module to identify a violation of the at least one process inefficiency design rule,
(d) instructions for causing the DRC module to automatically suggest at least one design change responsive to the violation of the process inefficiency design rule and automatically providing information regarding an estimated impact on the process corresponding to implementation of the suggested at least one design change, wherein:
the automatically suggested at least one design change is selected from the group consisting of: eliminating a slot, increasing a slot width, changing a round corner to an angled corner, and replacing a perforation line with a score line, and
the automatically provided information regarding the estimated impact on the process comprises an estimation of an increase in process throughput;
(e) instructions for causing the DRC module to receive a user input responsive to the suggested design change; and
(f) instructions for causing the DRC module to modify the CAD file in response to the user input.

22. A computer aided design (CAD) system for designing an article for manufacture from a starting material using a cutting tool in a process, the cutting tool comprising at least one steel die rule, the system comprising:
a computer processor having a design rule checking (DRC) module;
a user interface configured to enable a user to interactively provide a user input;
a computer memory, the computer memory configured to store (a) one or more design rules in a format readable by the DRC module and (b) a CAD file that defines a geometry of at least one individual periphery to be cut with the cutting tool for use in a packaging-manufacture process for making an article of packaging from the starting material, the one or more design rules comprising a plurality of process inefficiency rules corresponding to an inefficient but not inoperable geometry of the cutting tool documented as causing an inefficiency in a non-printing or non-platemaking operation of the process, wherein the plurality of process operation inefficiency design rules include at least one design rule corresponding to an inefficiency in a step for manufacturing the cutting tool, at least one design rule corresponding to an inefficiency in a step of a converting process comprising a cutting step using the cutting tool, and at least one design rule corresponding to an inefficiency in a waste stripping or waste ejection step, a gluing step, or a scoring step downstream of the cutting step, and the inefficient geometry is known to increase processing time in a process operation relative to a more efficient geometry when used in the process;
wherein the DRC module is configured to:
evaluate the CAD file relative to the one or more design rules;
identify in the CAD file one or more violations of the at least one process inefficiency design rule;
automatically suggest at least one design change responsive to each identified violation of the at least one process inefficiency design rule and automatically provide information regarding an estimated impact on the process corresponding to implementation of the suggested at least one design change, wherein:
the automatically suggested at least one design change is selected from the group consisting of: eliminating a slot, increasing a slot width, changing a round corner to an angled corner, and replacing a perforation line with a score line, and
the automatically provided information regarding the estimated impact on the process comprises an estimation of an increase in process throughput;
process a user input received in responsive to the suggested design change;
modify the CAD file in response to the user input.

23. The CAD system of claim 22, wherein the user interface is further configured to permit the user to interactively provide parameters corresponding to the design rules.

24. The CAD system of claim 22, wherein the user interface includes a graphical user interface that provides an illustration corresponding to at least one design rule and is configured to receive a user selection to apply or not apply the at least one design rule and a user definition of any variable parameter values.

25. The CAD system of claim 22, wherein the user interface is configured to identify the violation by displaying a graphical view of a portion of the CAD design with a highlighted area showing an outline of a shape to be cut as interpreted by the DRC module based upon the design.

* * * * *